(12) United States Patent
Ichikawa et al.

(10) Patent No.: US 7,403,340 B2
(45) Date of Patent: Jul. 22, 2008

(54) ZOOM OPTICAL SYSTEM AND ELECTRONIC IMAGING APPARATUS USING THE SAME

(75) Inventors: Keisuke Ichikawa, Hachioji (JP); Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/716,306

(22) Filed: Mar. 8, 2007

(65) Prior Publication Data

US 2008/0117524 A1 May 22, 2008

(30) Foreign Application Priority Data

Nov. 22, 2006 (JP) .............................. 2006-316193

(51) Int. Cl.
*G02B 15/14* (2006.01)
(52) U.S. Cl. ..................... 359/686; 359/682; 359/684
(58) Field of Classification Search ......... 359/680–682, 359/684, 686
See application file for complete search history.

(56) References Cited

U.S. PATENT DOCUMENTS 5,078,481 A * 1/1992 Nakayama et al. .......... 359/680
6,349,002 B1 2/2002 Shibayama et al.
2002/0008920 A1 1/2002 Mihara et al.
2002/0057502 A1 5/2002 Ishii et al.

FOREIGN PATENT DOCUMENTS

JP      11-211984      8/1999

\* cited by examiner

*Primary Examiner*—Scott J Sugarman
(74) *Attorney, Agent, or Firm*—Kenyon & Kenyon LLP

(57) ABSTRACT

A zoom optical system has, in order from the object side, a first lens unit with negative refracting power, including a single lens component; a second lens unit with positive refracting power, simply moved toward the object side when the magnification of the zoom optical system is changed in the range from a wide-angle position to a telephoto position; a third lens unit with negative refracting power; and a fourth lens unit with positive refracting power. In focusing on an object point separated at least 300 times a focal length at the wide-angle position, when the magnification is changed in the range from the wide-angle position to the telephoto position, the third lens unit and the fourth lens unit are moved together so that a relative spacing between the third lens unit and the fourth lens unit is widened or the fourth lens unit approaches an imaging point.

11 Claims, 12 Drawing Sheets

SPHERICAL ABERRATION
FNO 1.860

-0.20    0.20
(mm)

ASTIGMATISM
IH=3.60

-0.20    0.20
(mm)

DISTORTION
IH=3.60

-10.00   10.00
(%)

CHROMATIC ABERRATION OF MAGNIFICATION
IH=3.60

-0.02    0.02
(mm)

SPHERICAL ABERRATION
FNO 2.453

-0.20    0.20
(mm)

ASTIGMATISM
IH=3.60

-0.20    0.20
(mm)

DISTORTION
IH=3.60

-10.00   10.00
(%)

CHROMATIC ABERRATION OF MAGNIFICATION
IH=3.60

-0.02    0.02
(mm)

SPHERICAL ABERRATION
FNO 3.404

-0.20    0.20
(mm)

ASTIGMATISM
IH=3.60

-0.20    0.20
(mm)

DISTORTION
IH=3.60

-10.00   10.00
(%)

CHROMATIC ABERRATION OF MAGNIFICATION
IH=3.60

-0.02    0.02
(mm)

404.66 —··—   486.13 —·—   587.56 ———
435.84 — — —  656.27 ---------

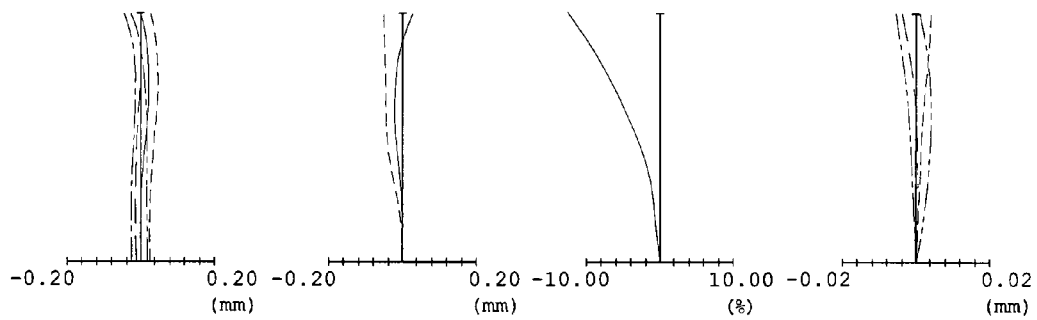

FIG.4A SPHERICAL ABERRATION FNO 1.878

FIG.4B ASTIGMATISM IH=3.60

FIG.4C DISTORTION IH=3.60

FIG.4D CHROMATIC ABERRATION OF MAGNIFICATION IH=3.60

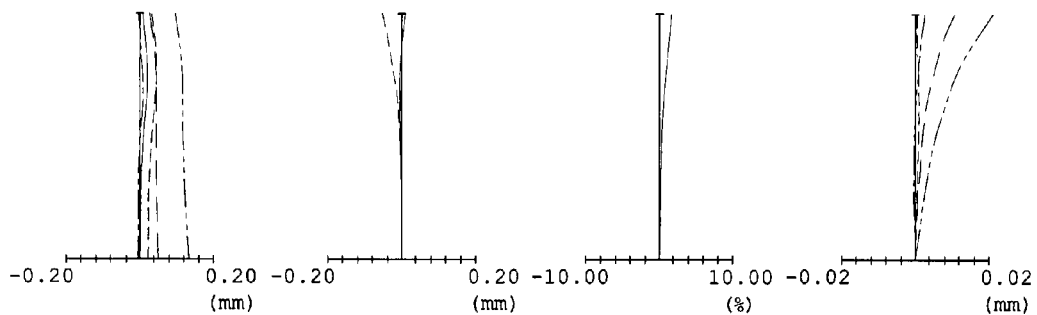

FIG.4E SPHERICAL ABERRATION FNO 2.483

FIG.4F ASTIGMATISM IH=3.60

FIG.4G DISTORTION IH=3.60

FIG.4H CHROMATIC ABERRATION OF MAGNIFICATION IH=3.60

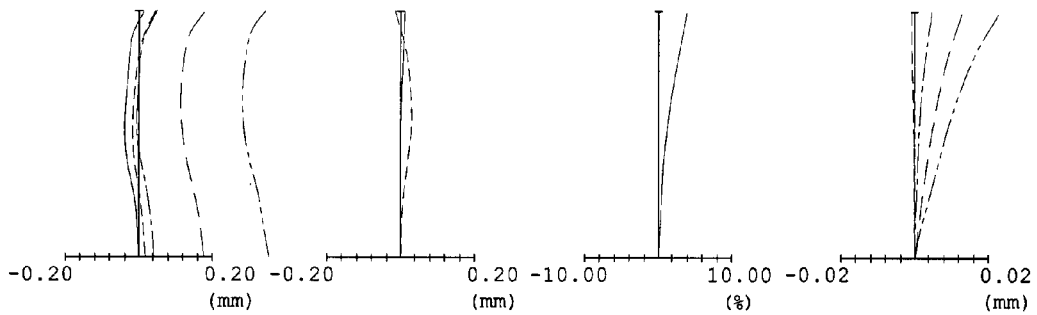

FIG.4I SPHERICAL ABERRATION FNO 3.434

FIG.4J ASTIGMATISM IH=3.60

FIG.4K DISTORTION IH=3.60

FIG.4L CHROMATIC ABERRATION OF MAGNIFICATION IH=3.60

404.66 —·—·—    486.13 —··—··—    587.56 ———
435.84 ————     656.27 ---------

FIG.6A
SPHERICAL ABERRATION
FNO 1.879
FIG.6B
ASTIGMATISM
IH=3.60
FIG.6C
DISTORTION
IH=3.60
FIG.6D
CHROMATIC ABERRATION OF MAGNIFICATION
IH=3.60
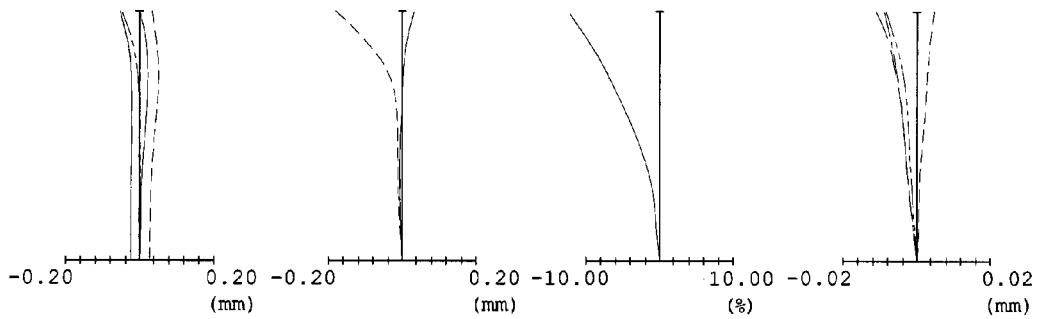
FIG.6E
SPHERICAL ABERRATION
FNO 2.496
FIG.6F
ASTIGMATISM
IH=3.60
FIG.6G
DISTORTION
IH=3.60
FIG.6H
CHROMATIC ABERRATION OF MAGNIFICATION
IH=3.60
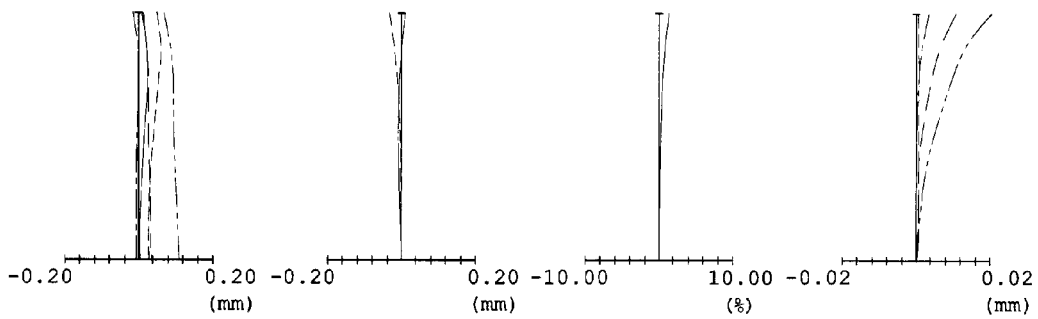
FIG.6I
SPHERICAL ABERRATION
FNO 3.441
FIG.6J
ASTIGMATISM
IH=3.60
FIG.6K
DISTORTION
IH=3.60
FIG.6L
CHROMATIC ABERRATION OF MAGNIFICATION
IH=3.60
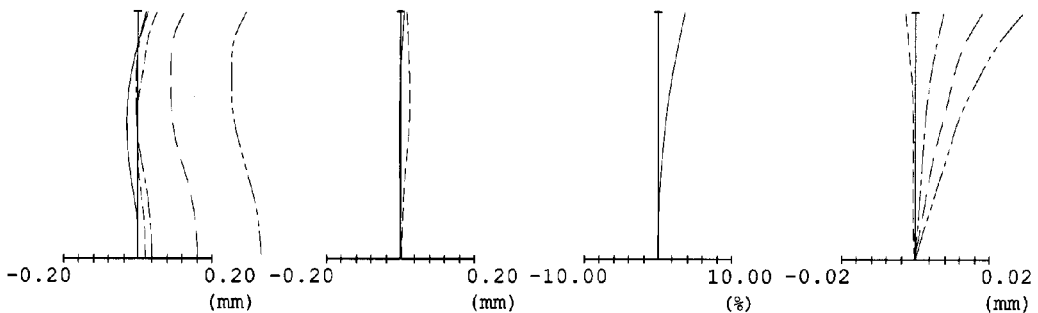
404.66 — · · —
435.84 — — — —
486.13 — — —
656.27 ----------
587.56 ————

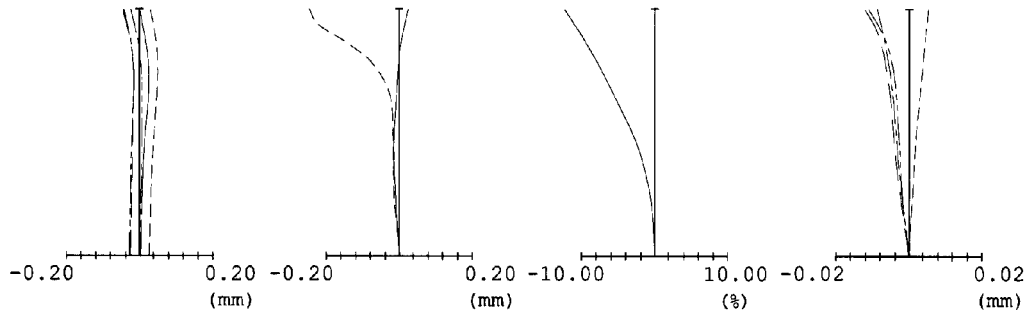
FIG.8A
SPHERICAL ABERRATION
FNO 1.998
FIG.8B
ASTIGMATISM
IH=3.60
FIG.8C
DISTORTION
IH=3.60
FIG.8D
CHROMATIC ABERRATION OF MAGNIFICATION
IH=3.60
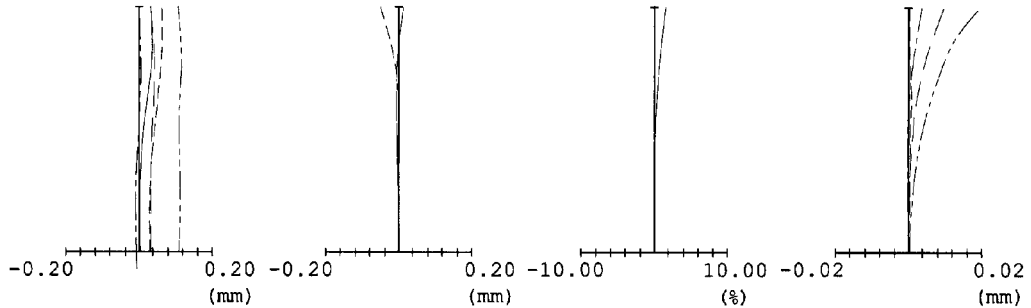
FIG.8E
SPHERICAL ABERRATION
FNO 2.642
FIG.8F
ASTIGMATISM
IH=3.60
FIG.8G
DISTORTION
IH=3.60
FIG.8H
CHROMATIC ABERRATION OF MAGNIFICATION
IH=3.60
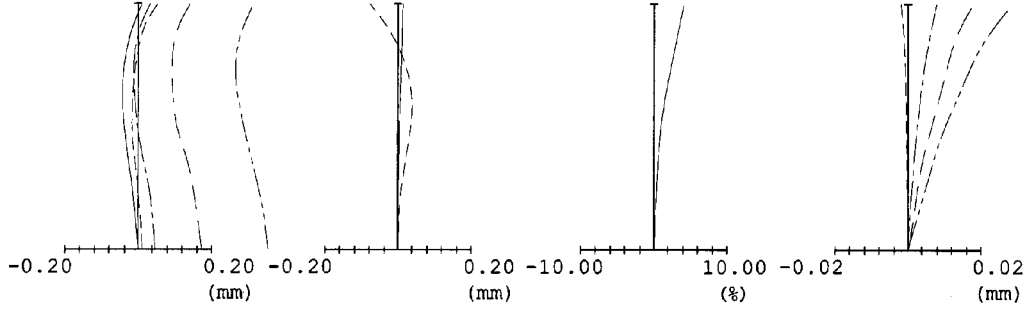
FIG.8I
SPHERICAL ABERRATION
FNO 3.628
FIG.8J
ASTIGMATISM
IH=3.60
FIG.8K
DISTORTION
IH=3.60
FIG.8L
CHROMATIC ABERRATION OF MAGNIFICATION
IH=3.60
404.66 — - —  486.13 — - —  587.56 ———
435.84 — — —  656.27 --------

FIG.10A SPHERICAL ABERRATION FNO 1.866

FIG.10B ASTIGMATISM IH=3.60

FIG.10C DISTORTION IH=3.60

FIG.10D CHROMATIC ABERRATION OF MAGNIFICATION IH=3.60

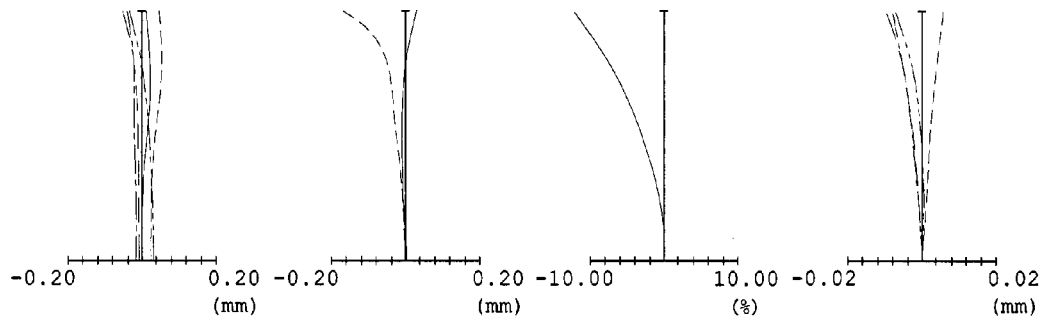

FIG.10E SPHERICAL ABERRATION FNO 2.466

FIG.10F ASTIGMATISM IH=3.60

FIG.10G DISTORTION IH=3.60

FIG.10H CHROMATIC ABERRATION OF MAGNIFICATION IH=3.60

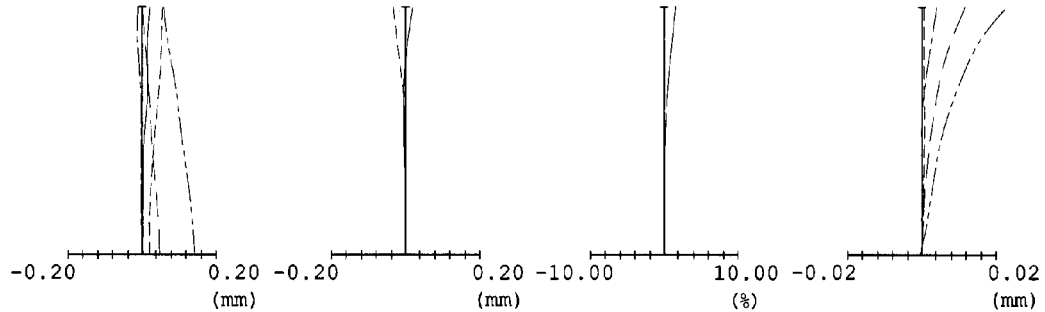

FIG.10I SPHERICAL ABERRATION FNO 3.391

FIG.10J ASTIGMATISM IH=3.60

FIG.10K DISTORTION IH=3.60

FIG.10L CHROMATIC ABERRATION OF MAGNIFICATION IH=3.60

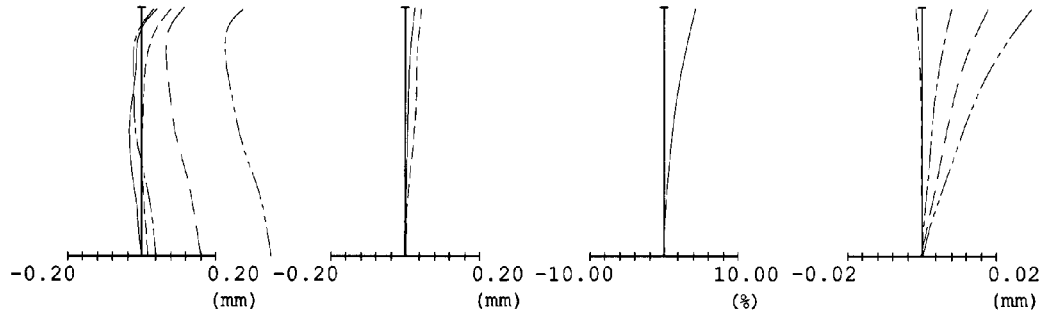

404.66 —·—·—  486.13 —··—  587.56 ———
435.84 — — —  656.27 - - - - -

ZOOM OPTICAL SYSTEM AND ELECTRONIC IMAGING APPARATUS USING THE SAME

This application claims benefits of Japanese Application No. 2006-316193 filed in Japan on Nov. 22, 2006, the contents of which are incorporated herein by reference.

BACKGROUND OF THE INVENTION

1. Field of the Invention

This invention relates to a zoom optical system which is peculiarly suitable for an electronic imaging optical system, has a large aperture, and is excellent in imaging performance and an electronic imaging apparatus having this zoom optical system.

2. Description of Related Art

Digital cameras have reached levels of practical use in high pixel density (high image quality) and small-sized and slim designs. As a result, the digital cameras have replaced silver-halide 35 mm cameras with respect to their functions and markets. The next performance requirement is that an object can be clearly photographed even in surroundings in which the amount of light is small. Hence, it is imperatively needed that high imaging performance and small thickness that have been attained so far in optical systems are left as they are and a large aperture ratio is designed.

As a conventional zoom optical system suitable for the design of the large aperture ratio, a positive refracting power lead type zoom optical system has been known. This positive refracting power lead type zoom optical system includes, in order from the object side, a first lens unit with positive refracting power, a second lens unit with negative refracting power, a third lens unit with positive refracting power, and a fourth lens unit with positive refracting power.

On the other hand, as a zoom optical system suitable for a slim design, a negative refracting power lead type zoom optical system has been known. This negative refracting power lead type zoom optical system includes, in order from the object side, a first lens unit with negative refracting power, a second lens unit with positive refracting power, and a third lens unit with positive refracting power.

SUMMARY OF THE INVENTION

The zoom optical system according to the present invention comprises, in order from the object side, a lens unit A with negative refracting power, including a single lens component; a lens unit B with positive refracting power, simply moved toward the object side when the magnification of the zoom optical system is changed in the range from a wide-angle position to a telephoto position; a lens unit C with negative refracting power; and a lens unit D with positive refracting power. In focusing on an object point separated at least 300 times a focal length at the wide-angle position, when the magnification is changed in the range from the wide-angle position to the telephoto position, the lens unit C and the lens unit D are moved together so that a relative spacing between the lens unit C and the lens unit D is widened or the lens unit D approaches the image side. In the zoom optical system of the present invention, it is desirable to satisfy one of the following conditions:

$$0 \leq M_{C-D}/M_B \leq 0.4 \quad (1)$$

$$0 \leq M_{D-I}/M_B \leq 0.5 \quad (2)$$

where $M_B$ is the amount of movement (the absolute value) of the lens unit B when the magnification is changed in the range from the wide-angle position to the telephoto position in infinite object point focusing, $M_{C-D}$ is the amount of change (the absolute value) of the spacing between the lens unit C and the lens unit D when the magnification is changed in the range from the wide-angle position to the telephoto position in infinite object point focusing, and $M_{D-I}$ is the amount of change (the absolute value) of spacing between the lens unit D and an image sensor when the magnification is changed in the range from the wide-angle position to the telephoto position in infinite object point focusing.

In the zoom optical system of the present invention, it is desirable that the lens unit C and the lens unit D are moved together in focusing.

In the zoom optical system of the present invention, it is desirable that the relative spacing between the lens unit C and the lens unit D is changed in focusing.

In the zoom optical system of the present invention, it is desirable that in a state where the lens unit A and the lens unit B are fixed, when the lens unit C and the lens unit D are moved to focus an object point at a shorter distance, the spacing between the lens unit C and the lens unit D is narrowed.

In the zoom optical system of the present invention, it is desirable to satisfy the following condition:

$$0.2 \leq d_{CD}/fw \leq 1.2 \quad (3)$$

where $d_{CD}$ is the spacing between the lens unit C and the lens unit D on the optical axis in infinite object point focusing at the wide-angle position and fw is the focal length of the entire system of the zoom optical system at the wide-angle position.

In the zoom optical system of the present invention, it is desirable that the lens unit C includes the negative lens alone and the lens unit D includes the positive lens alone.

In the zoom optical system of the present invention, it is desirable to satisfy the following conditions:

$$-1.5 \leq (R_{CF}+R_{CR})/(R_{CF}-R_{CR}) \leq 1.5 \quad (4)$$

$$0.0 \leq (R_{DF}+R_{DR})/(R_{DF}-R_{DR}) \leq 1.5 \quad (5)$$

where $R_{CF}$ is the radius of curvature of the most object-side surface in the lens unit C, $R_{CR}$ is the radius of curvature of the most image-side surface in the lens unit C, $R_{DF}$ is the radius of curvature of the most object-side surface in the lens unit D, and $R_{DR}$ is the radius of curvature of the most image-side surface in the lens unit D.

In the zoom optical system of the present invention, it is desirable that the lens component of the lens unit A is a cemented lens component including, in order from object side, a negative lens and a positive lens.

In the zoom optical system of the present invention, it is desirable that the lens unit B includes two lens components, a single lens component and a cemented lens component, or three lenses.

The electronic imaging apparatus having the zoom optical system according to the present invention comprises a zoom optical system and an image processing unit that has an electronic image sensor in the proximity of the imaging position of the zoom optical system so that an image formed through the zoom optical system is picked up by the electronic image sensor and image data picked up by the electronic image sensor are electrically processed and can be output as image data whose format is changed. The zoom optical system is the zoom optical system of the present invention described above, and in nearly infinite object point focusing, satisfies the following condition:

$$0.7 < y_{07}/(fw \cdot \tan \omega_{07w}) < 0.94 \qquad (21)$$

where $y_{07}$ is expressed by $y_{07} = 0.7 y_{10}$ when $y_{10}$ denotes a distance from the center to a point farthest from the center (the maximum image height) within an effective imaging surface (an imageable surface) of the electronic image sensor, $\omega_{07w}$ is an angle made by a direction of an object point corresponding to an image point, connecting the center of the imaging surface at the wide-angle position and the position of the image height $y_{07}$, with the optical axis, and fw is the focal length of the entire system of the zoom optical system at the wide-angle position.

When the first lens unit is constructed with a single lens component, astigmatism is liable to deteriorate. This constitutes an obstacle to the design of the large aperture ratio. According to the present invention, even when the first lens unit is constructed with the single lens component, astigmatism can be favorably corrected. As a result, the zoom optical system of the large aperture ratio and the electronic imaging apparatus having this zoom optical system are attained. Moreover, when the first lens unit is constructed with the single lens component alone, the length of a collapsible lens barrel can be reduced. Whereby, in the zoom optical system, the slim design and the large aperture ratio can be made compatible.

These and other features and advantages of the present invention will become apparent from the following detailed description of the preferred embodiments when taken in conjunction with the accompanying drawings.

BRIEF DESCRIPTION OF THE DRAWINGS

FIGS. 4A-4D, 4E-4H, and 4I-4L are diagrams showing aberration characteristics at wide-angle, middle, and telephoto positions, respectively, in infinite object point focusing of the zoom optical system of FIGS. 3A-3C;

FIGS. 6A-6D, 6E-6H, and 6I-6L are diagrams showing aberration characteristics at wide-angle, middle, and telephoto positions, respectively, in infinite object point focusing of the zoom optical system of FIGS. 5A-5C;

FIGS. 8A-8D, 8E-8H, and 8I-8L are diagrams showing aberration characteristics at wide-angle, middle, and telephoto positions, respectively, in infinite object point focusing of the zoom optical system of FIGS. 7A-7C;

FIGS. 10A-10D, 10E-10H, and 10I-10L are diagrams showing aberration characteristics at wide-angle, middle, and telephoto positions, respectively, in infinite object point focusing of the zoom optical system of FIGS. 9A-9C;

DETAILED DESCRIPTION OF THE PREFERRED EMBODIMENTS

Figure 1A:
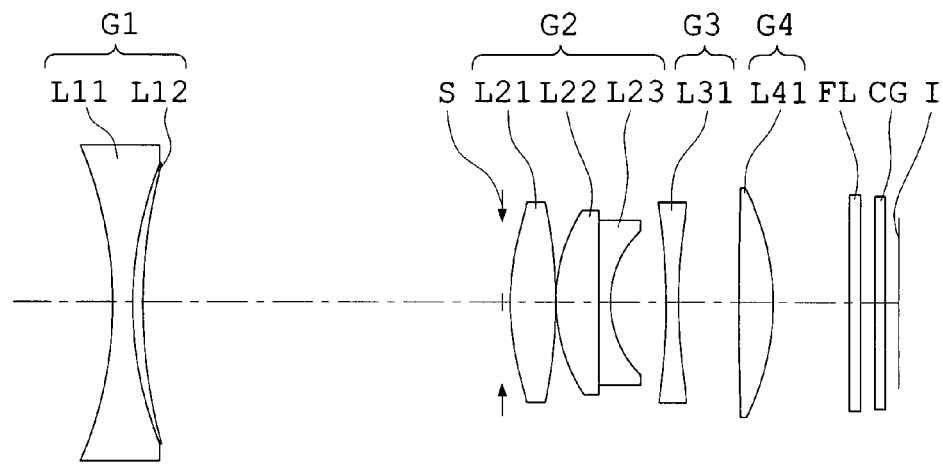
FIGS. 1A, 1B, and 1C are sectional views showing optical arrangements, developed along the optical axis, at wide-angle, middle, and telephoto positions, respectively, in infinite object point focusing of Embodiment 1 of the zoom optical system according to the present invention.

Before undertaking the description of the embodiments, the function and effect of the present invention will be explained. The zoom optical system of the present invention comprises, in order from the object side, a lens unit A with negative refracting power, including a single lens component; a lens unit B with positive refracting power, simply moved toward the object side when the magnification of the zoom optical system is changed in the range from a wide-angle position to a telephoto position; a lens unit C with negative refracting power; and a lens unit D with positive refracting power. In focusing on an object point separated at least 300 times a focal length at the wide-angle position, when the magnification is changed in the range from the wide-angle position to the telephoto position, the lens unit C and the lens unit D are moved together. In this case, the lens unit C and the lens unit D are moved so that a relative spacing between the lens unit C and the lens unit D is widened or the lens unit D approaches the image side.

As in the present invention, when the most object-side negative lens unit is constructed with the single lens component alone, the fluctuation of astigmatism at the wide-angle position or in a magnification change tends to become heavy. Thus, in the present invention, the zoom optical system comprises, in order from the object side, the lens unit A, followed by three lens units, namely the lens unit B with positive refracting power, the lens unit C with negative refracting power, and the lens unit D with positive refracting power. In particular, in focusing on the object point separated at least 300 times the focal length at the wide-angle position, when the magnification is changed in the range from the wide-angle position to the telephoto position, the lens unit C and the lens unit D are moved together so that the relative spacing between the lens unit C and the lens unit D is widened or the lens unit D approaches the image side (an imaging point). By doing so, the fluctuation of astigmatism at the wide-angle position or in the magnification change can be corrected. As a result, even when the most object-side negative lens unit (the lens unit A) is constructed with the single lens component alone, the design of the large aperture ratio of the optical system can be realized.

Also, in the conventional negative refracting power lead type zoom optical system, the most object-side lens unit is constructed with at least two lenses and an air spacing is provided in the lens unit. Consequently, the thickness of the optical system is increased. In contrast to this, when the lens unit A is constructed with the single lens component alone as in the zoom optical system of the present invention, this arrangement is very effective for the slim design in a depth direction of the optical system. In particular, when the collapsible lens barrel is adopted, the greatest effect is brought about.

In the zoom optical system of the present invention, it is favorable to satisfy one of the following conditions:

$$0 \leq M_{C-D}/M_B \leq 0.4 \qquad (1)$$

$$0 \leq M_{D-I}/M_B \leq 0.5 \qquad (2)$$

where $M_B$ is the amount of movement (the absolute value) of the lens unit B when the magnification is changed in the range from the wide-angle position to the telephoto position in infinite object point focusing, $M_{C-D}$ is the amount of change (the absolute value) of the spacing between the lens unit C and the lens unit D when the magnification is changed in the range from the wide-angle position to the telephoto position in infinite object point focusing, and $M_{D-I}$ is the amount of change (the absolute value) of a spacing between the lens unit D and an image sensor when the magnification is changed in the range from the wide-angle position to the telephoto position in infinite object point focusing.

Each of Conditions (1) and (2) determines the amount of change of the spacing between the lens unit C and the lens unit D when the magnification is change in focusing on the infinite object point. If the lower limit of one of Conditions (1) and (2) is passed, it is difficult that when the optical system is designed for the large aperture ratio, the fluctuation of astigmatism in the magnification change is kept to a minimum. On the other hand, beyond the upper limit of one of Conditions (1) and (2), the fluctuations of aberrations (chromatic aberration, spherical aberration, etc.) other than astigmatism are liable to become heavy when the optical system is designed for the large aperture ratio.

Instead of satisfying one of Conditions (1) and (2), it is more favorable to satisfy one of the following conditions:

$$0.05 \leq M_{C-D}/M_B \leq 0.3 \qquad (1')$$

$$0.06 \leq M_{D-I}/M_B \leq 0.4 \qquad (2')$$

Instead of satisfying one of Conditions (1) and (2), it is most favorable to satisfy one of the following conditions:

$$0.10 \leq M_{C-D}/M_B \leq 0.2 \qquad (1'')$$

$$0.12 \leq M_{D-I}/M_B \leq 0.3 \qquad (2'')$$

In the zoom optical system of the present invention, the lens unit C and the lens unit D are moved together in focusing on a near object point from a far object point. In this case, when the lens unit C and the lens unit D are moved so that the relative spacing between them is changed, the fluctuation of astigmatism due to focusing can be kept to a minimum. In particular, it is good practice to move the lens unit C and the lens unit D so as to simply narrow the relative spacing between them. In doing so, when the optical system is designed for the large aperture ratio, the fluctuation of astigmatism due to focusing can be suppressed.

Further, it is favorable to satisfy the following condition:

$$0.2 \leq d_{CD}/fw \leq 1.2 \qquad (3)$$

where $d_{CD}$ is the spacing between the lens unit C and the lens unit D on the optical axis in infinite object point focusing at the wide-angle position and fw is the focal length of the entire system of the zoom optical system at the wide-angle position.

Below the lower limit of Condition (3), it becomes difficult to make favorable correction for astigmatism over the entire zoom region when the optical system is designed for the large aperture ratio. Alternatively, it becomes difficult to lower a sensitivity to decetration in each of the lens units C and D. On the other hand, beyond the upper limit of Condition (3), it becomes difficult to reduce the length of the lens barrel when collapsed.

Instead of satisfying Condition (3), it is more favorable to satisfy the following condition:

$$0.25 \leq d_{CD}/fw \leq 0.9 \qquad (3')$$

Further, instead of satisfying Condition (3), it is most favorable to satisfy the following condition:

$$0.3 \leq d_{CD}/fw \leq 0.6 \qquad (3'')$$

In the zoom optical system of the present invention, when the lens unit C is constructed with a negative lens alone and the lens unit D is constructed with a positive lens alone, the slim design can be realized in addition to the object of the present invention of the design of the large aperture ratio. In this case, it is essential to incorporate an aspherical surface in each lens unit.

Also, it is desirable to construct the optical system so as to satisfy the following conditions:

$$-1.5 \leq (R_{CF}+R_{CR})/(R_{CF}-R_{CR}) \leq 1.5 \qquad (4)$$

$$0.0 \leq (R_{DF}+R_{DR})/(R_{DF}-R_{DR}) \leq 1.5 \qquad (5)$$

where $R_{CF}$ is the radius of curvature of the most object-side surface in the lens unit C, $R_{CR}$ is the radius of curvature of the most image-side surface in the lens unit C, $R_{DF}$ is the radius of curvature of the most object-side surface in the lens unit D, and $R_{DR}$ is the radius of curvature of the most image-side surface in the lens unit D.

By doing so, dead space between the lens unit B, the lens unit C, and the lens unit D when the lens barrel is collapsed can be kept to a minimum. Also, when the lens surface is configured as an aspherical surface, each of $R_{CF}$, $R_{CR}$, $R_{DF}$, and $R_{DR}$ denotes a paraxial radius of curvature.

Instead of satisfying Conditions (4) and (5), it is more desirable to satisfy the following conditions:

$$-1.2 \leq (R_{CF}+R_{CR})/(R_{CF}-R_{CR}) \leq 1.2 \qquad (4')$$

$$0.3 \leq (R_{DF}+R_{DR})/(R_{DF}-R_{DR}) \leq 1.2 \qquad (5')$$

Further, instead of satisfying Conditions (4) and (5), it is most desirable to satisfy the following conditions:

$$-1.0 \leq (R_{CF}+R_{CR})/(R_{CF}-R_{CR}) \leq 1.0 \qquad (4'')$$

$$0.6 \leq (R_{DF}+R_{DR})/(R_{DF}-R_{DR}) \leq 1.0 \qquad (5'')$$

It is favorable that the lens component of the lens unit A is a cemented lens component in which a positive lens $L_{AP}$ and a negative lens $L_{AN}$ are cemented, from a viewpoint of correction for astigmatism.

When a refractive index ndp relative to the d line of the positive lens $L_{AP}$ (an optical material used for the positive lens $L_{AP}$) of the lens unit A satisfies the following condition, this is advantageous to correction for astigmatism.

$$1.50 \leq ndp \leq 1.85 \qquad (6)$$

Below the lower limit of Condition (6), astigmatism is not completely corrected. On the other hand, beyond the upper limit of Condition (6), coma is not completely corrected.

Instead of satisfying Condition (6), it is more desirable to satisfy the following condition:

$$1.55 \leq ndp \leq 1.80 \tag{6'}$$

Further, instead of satisfying Condition (6), it is most desirable to satisfy the following condition:

$$1.57 \leq ndp \leq 1.77 \tag{6''}$$

From a viewpoint of correction for chromatic aberration, it is favorable that the positive lens $L_{AP}$ (the optical material used for the positive lens $L_{AP}$) satisfies conditions described below. That is, in an orthogonal coordinate system in which the axis of abscissas is taken as vdp and the axis of ordinates is taken as θgFp, it is desirable that when a straight line expressed by $$\theta gFp = \alpha p \times vdp + \beta p \text{ (where } (\alpha p = -0.00163)$$

is set, vdp and θgFp of the positive lens $L_{AP}$ are contained in both the region defined by a straight line in the lower limit of Condition (7) described below and by a straight line in the upper limit of Condition (7) and the region defined by Condition (8) described below.

$$0.6400 < \beta p < 0.9000 \tag{7}$$

$$3 < vdp < 27 \tag{8}$$

where θgFp is a partial dispersion ratio (ng−nF)/(nF−nC) of the positive lens $L_{AP}$, vdp is an Abbe's number (nd−1)/(nF−nC) of the positive lens $L_{AP}$, nd is a refractive index relative to the d line, nC is a refractive index relative to the C line, nF is a refractive index relative to the F line, and ng is a refractive index relative to the g line.

Below the lower limit of Condition (7), chromatic aberration due to the secondary spectrum, namely chromatic aberration of the g line in the case of achromatism in the F line and the C line, is not completely corrected when the optical system is designed for the large aperture ratio. Consequently, when the object is photographed by the optical system, it is difficult to ensure sharpness of the image of the photographed object.

On the other hand, beyond the upper limit of Condition (7), chromatic aberration due to the secondary spectrum is overcorrected when the optical system is designed for the large aperture ratio. Consequently, like the case of "below the lower limit of Condition (7)", it is difficult to ensure sharpness of the image of the photographed object. Below the lower limit of Condition (8) or beyond the upper limit, achromatism itself in the F line and the C line is difficult and the fluctuation of chromatic aberration in zooming is increased, when the optical system is designed for the large aperture ratio. Hence, when the object is photographed by the optical system, it is difficult to ensure sharpness of the image of the photographed object.

Instead of satisfying Condition (7), it is more favorable to satisfy the following condition:

$$0.6800 < \beta p < 0.8700 \tag{7'}$$

Further, instead of satisfying Condition (7), it is much more favorable to satisfy the following condition:

$$0.6900 < \beta p < 0.8200 \tag{7''}$$

In an orthogonal coordinate system in which the axis of abscissas is taken as vdp and the axis of ordinates is taken as θhgp, it is desirable that when a straight line expressed by $$\theta hgp = \alpha hgp \times vdp + \beta hgp \text{ (where } \alpha hgp = -0.00225)$$

is set, vdp and θhgp of the positive lens $L_{AP}$ are contained in both the region defined by a straight line in the lower limit of Condition (9) described below and by a straight line in the upper limit of Condition (9) and the region defined by Condition (8) described below.

$$0.5700 < \beta hgp < 0.9500 \tag{9}$$

$$3 < vdp < 27 \tag{8}$$

where θhgp is a partial dispersion ratio (nh−ng)/(nF−nC) of the positive lens $L_{AP}$, vdp is an Abbe's number (nd−1)/(nF−nC) of the positive lens $L_{AP}$, nd is a refractive index relative to the d line, nC is a refractive index relative to the C line, nF is a refractive index relative to the F line, ng is a refractive index relative to the g line, and nh is a refractive index relative to the h line.

Below the lower limit of Condition (9), chromatic aberration due to the secondary spectrum, namely chromatic aberration of the h line in the case of achromatism in the F line and the C line, is not completely corrected when the optical system is designed for the large aperture ratio. Consequently, when the object is photographed by the optical system, purple flare and color blurring are liable to occur in the image of the photographed object. On the other hand, beyond the upper limit of Condition (9), chromatic aberration due to the secondary spectrum, namely chromatic aberration of the h line in the case of achromatism in the F line and the C line, is overcorrected when the optical system is designed for the large aperture ratio. Consequently, when the object is photographed by the optical system, purple flare and color blurring are liable to occur in the image of the photographed object.

Instead of satisfying Condition (9), it is more favorable to satisfy the following condition:

$$0.6200 < \beta hgp < 0.9200 \tag{9'}$$

Further, instead of satisfying Condition (9), it is much more favorable to satisfy the following condition:

$$0.6500 < \beta hgp < 0.8700 \tag{9''}$$

In the zoom optical system of the present invention, when the optical system satisfies a condition described below, correction efficiency relative to the second spectrum becomes high where the optical system is designed for the large aperture ratio. Consequently, the sharpness of the image of the photographed object is increased.

$$0.08 \leq \theta gFp - \theta gFn \leq 0.50 \tag{10}$$

where θgFp is a partial dispersion ratio (ng−nF)/(nF−nC) of the positive lens $L_{AP}$, θgFn is a partial dispersion ratio (ng−nF)/(nF−nC) of the negative lens $L_{AN}$, nC is a refractive index relative to the C line, nF is a refractive index relative to the F line, and ng is a refractive index relative to the g line.

Instead of satisfying Condition (10), it is more desirable to satisfy the following condition:

$$0.10 \leq \theta gFp - \theta gFn \leq 0.40 \tag{10'}$$

Further, instead of satisfying Condition (10), it is most desirable to satisfy the following condition:

$$0.12 \leq \theta gFp - \theta gFn \leq 0.30 \tag{10''}$$

In the zoom optical system of the present invention, it is desirable to satisfy a condition described below. In this case, color flare and blurring can be lessened in the image of the photographed object.

$$0.09 \leq \theta hgp - \theta hgn \leq 0.60 \tag{11}$$

where θhgp is a partial dispersion ratio (nh−ng)/(nF−nC) of the positive lens $L_{AP}$, θhgn is a partial dispersion ratio (nh−ng)/(nF−nC) of the negative lens $L_{AN}$, nC is a refractive index relative to the C line, ng is a refractive index relative to the g line, and nh is a refractive index relative to the h line.

Instead of satisfying Condition (11), it is more desirable to satisfy the following condition:

$$0.12 \leq \theta hgp - \theta hgn \leq 0.50 \quad (11')$$

Further, instead of satisfying Condition (11), it is most desirable to satisfy the following condition:

$$0.15 \leq \theta hgp - \theta hgn \leq 0.40 \quad (11'')$$

In the zoom optical system of the present invention, achromatism in the C line and the F line of longitudinal chromatic aberration and chromatic aberration of magnification is facilitated when the optical system satisfies the following condition:

$$\nu dp - \nu dn \leq -30 \quad (12)$$

where $\nu dp$ is an Abbe's number $(nd-1)/(nF-nC)$ of the positive lens $L_{AP}$, $\nu dn$ is an Abbe's number $(nd-1)/(nF-nC)$ of the negative lens $L_{AN}$, nd is a refractive index relative to the d line, nC is a refractive index relative to the C line, and nF is a refractive index relative to the F line.

Instead of satisfying Condition (12), it is more desirable to satisfy the following condition:

$$\nu dp - \nu dn \leq -40 \quad (12')$$

Further, instead of satisfying Condition (12), it is most desirable to satisfy the following condition:

$$\nu dp - \nu dn \leq -50 \quad (12'')$$

Also, for the optical material of the positive lens $L_{AP}$, it is good practice to use a material that inorganic microscopic particles are diffused in an organic material, such as resin, or in such an organic material and thereby its optical property is changed. When such an optical material is used, it is possible to work the positive lens $L_{AP}$ as a thin lens. In order to work (configure) as thin the positive lens $L_{AP}$ as possible, it is desirable that the positive lens is configured as a cemented lens. That is, energy curing resin is used as the positive lens $L_{AP}$, which is configured directly on the negative lens $L_{AN}$. By doing so, the thickness of the positive lens $L_{AP}$ can be made small. As the energy curing resin, for example, ultraviolet curing resin is available.

In this case, from the viewpoint of the durability of resin, it is good practice to cement, in order from the object side, the negative lens $L_{AN}$ and the positive lens $L_{AP}$ as a cemented lens component of the lens unit A. It is desirable that its lens shape is taken as described below. When z is taken as the coordinate in the direction of the optical axis, h is taken as the coordinate normal to the optical axis, k represents a conic constant, $A_4$, $A_6$, $A_8$, and $A_{10}$ represent aspherical coefficients, and R represents the radius of curvature of a spherical component on the optical axis, the configuration of an aspherical surface is expressed by the following equation:

$$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (13)$$

In this case, it is desirable to satisfy the following condition:

$$0.1 \leq |z_{AR}(h) - z_{AC}(h)|/tp \leq 0.96 \quad (14)$$

where $z_{AC}$ is the shape of the cementation-side surface of the positive lens $L_{AP}$ and $z_{AR}$ is the shape of the air-contact-side surface of the positive lens $L_{AP}$, both according to Equation (13); h is expressed by h=0.7 fw when the focal length of the entire system of the zoom optical system at the wide-angle position is denoted by fw; and tp is the thickness, measured along the optical axis, of the positive lens $L_{AP}$. Also, always Z(0)=0.

Below the lower limit of Condition (14), correction for chromatic aberration is liable to become insufficient. On the other hand, beyond the upper limit of Condition (14), it becomes difficult to ensure a peripheral edge thickness of the positive lens $L_{AP}$. Specifically, when the thickness of the positive lens $L_{AP}$ is made small, it is necessary to ensure the peripheral edge thickness by a preset amount, but it becomes difficult to ensure this preset amount of edge thickness.

Instead of satisfying Condition (14), it is more desirable to satisfy the following condition:

$$0.3 \leq |z_{AR}(h) - z_{AC}(h)|/tp \leq 0.94 \quad (14')$$

Further, instead of satisfying Condition (14), it is most desirable to satisfy the following condition:

$$0.5 \leq |z_{AR}(h) - z_{AC}(h)|/tp \leq 0.92 \quad (14'')$$

When the thickness, measured along the optical axis, of the negative lens $L_{AN}$ of the lens unit A is denoted by tn, it is favorable to satisfy the following condition:

$$0.3 \leq tp/tn \leq 1.0 \quad (15)$$

Alternatively, when shapes of the most object-side surface and the most image-side surface of the lens unit A are considered as described below, astigmatism can be effectively corrected.

That is, when the configuration of the aspherical surface is expressed by Equation (13), it is desirable to satisfy the following conditions:

$$-50 \leq k_{AF} \leq 10 \quad (16)$$

$$-20 \leq k_{AR} \leq 20 \quad (17)$$

and to further satisfy the following condition:

$$-8 \leq z_{AF}(h)/z_{AR}(h) \leq 2 \quad (18)$$

where $k_{AF}$ is a k value relative to the most object-side surface of the lens unit A and $k_{AR}$ is a k value relative to the most image-side surface of the lens unit A, each of which is the k value in Equation (13); $z_{AF}$ is the shape of the most object-side surface of the lens unit A; $z_{AR}$ is the shape of the most image-side surface of the lens unit A; and h is expressed by h=0.7 fw when the focal length of the entire system of the zoom optical system at the wide-angle position is denoted by fw.

Beyond the upper limit of Condition (18), this is liable to become disadvantageous to correction for astigmatism. On the other hand, below the lower limit of Condition (18), the amount of occurrence of distortion is materially increased. Hence, even though an image processing function to be described later is used to correct distortion, an image periphery is enlarged radially (in a direction from the image center toward the periphery) by this correction. As a consequence, the resolution of a peripheral portion in a meridional direction is liable to be impaired.

Instead of satisfying Condition (18), it is more desirable to satisfy the following condition:

$$-4 \leq z_{AF}(h)/z_{AR}(h) \leq 0 \quad (18')$$

Further, instead of satisfying Condition (18), it is most desirable to satisfy the following condition:

$$-2 \leq z_{AF}(h)/z_{AR}(h) \leq -0.3 \quad (18'')$$

Also, in the zoom optical system of the present invention, it is favorable that when the magnification is change in the range from the wide-angle position to the telephoto position, the lens unit A is moved back and forth along the optical axis in such a way that it is initially moved toward the image side. This causes the overall length of the optical system to be reduced and is effective for the slim design where the lens barrel is collapsed.

In the zoom optical system of the present invention, it is desirable that the lens unit B is constructed with two lens components, a single lens component and a cemented lens component, or three lenses. This is advantageous to a reduction in the overall length and corrections for chromatic aberration and astigmatism. Here, it is desirable that the lens unit B has positive refracting power and includes, in order from the object side, a single positive lens component B1 and a cemented lens component B2 of a positive lens and a negative lens. Alternatively, it is desirable that the lens unit B has positive refracting power and includes the single positive lens component B1 and the cemented lens component B2 of a positive lens, a negative lens, and a negative lens. In such an arrangement, it is desirable that an average value $_{AVE}nd_{2p}$ of refractive indices (relative to the d line) of all positive lenses in the lens component B1 and the lens component B2 is 1.79 or more. By doing so, astigmatism can be favorably corrected. Also, if the average value $_{AVE}nd_{2p}$ is below 1.79, it becomes difficult that astigmatism is favorably corrected.

It is also desirable that, from the viewpoint of chromatic aberration, an average value $_{AVE}vd_{2N}$ of Abbe's numbers (relative to the d line) of all negative lenses in the lens component B1 and the lens component B2 is 25 or less (preferably 10 or more).

Subsequently, a description will be given of an auxiliary means for making correction for astigmatism more effectively.

When the lens unit A is constructed with a single lens component alone as in the pre-sent invention, correction for astigmatism and correction for barrel distortion tend to have a trade-off relation. Thus, in the present invention, special attention is devoted to this point so that the occurrence of distortion is tolerated to some extent and the distortion of an image shape is corrected by the image processing function contained in the electronic imaging apparatus, as the auxiliary means.

Here, correction for distortion by image processing will be described in detail.

It is assumed that an infinite object is imaged by an optical system free of distortion. In this case, the formed image is free of distortion and thus the following equation is established:

$$f = y/\tan \omega \quad (19)$$

where y is the height of an image point from the optical axis, f is the focal length of an imaging system, and ω is an angle made by the direction of an object point corresponding to the image point connected to the position of the height y from the center of the imaging plane with the optical axis.

On the other hand, in the optical system, when barrel distortion is tolerated only in the proximity of the wide-angle position, the following condition is obtained:

$$f > y/\tan \omega \quad (20)$$

That is, when the angle ω and the height y are set to constant values, the focal length f at the wide-angle position may remain long and correction for aberration is facilitated accordingly. Although a lens unit corresponding to the lens unit A is usually constructed with at least two lens components, this reason is that corrections for distortion and astigmatism are made compatible. In contrast to this, in the zoom optical system of the pre-sent invention, the occurrence of distortion is tolerated to some extent. That is, it is not necessary that corrections for distortion and astigmatism are made compatible, and thus correction for astigmatism becomes easy.

Thus, in the electronic imaging apparatus having the zoom optical system of the pre-sent invention, image data obtained by the electronic image sensor are processed by the image processing. In this processing, the image data (the image shape) are changed so that barrel distortion is corrected. By doing so, the image data finally obtained provide a shape very similar to the object. Thus, it is only necessary to output the image of the object into a CRT and a printer in accordance with the image data.

Here, it is favorable to adopt the zoom optical system so as to satisfy the following condition in nearly infinite object point focusing:

$$0.7 < y_{07}/(fw \cdot \tan \omega_{07w}) < 0.94 \quad (21)$$

where $y_{07}$ is expressed by $y_{07} = 0.7 y_{10}$ when $y_{10}$ denotes a distance from the center to a point farthest from the center (the maximum image height) within an effective imaging surface (an imageable surface) of the electronic image sensor, $\omega_{07w}$ is an angle made by a direction of an object point corresponding to an image point, connecting the center of the imaging surface at the wide-angle position and the position of the image height $y_{07}$, with the optical axis, and fw is the focal length of the entire system of the zoom optical system at the wide-angle position.

Condition (21) determines the extent of barrel distortion at the zoom wide-angle position. When Condition (21) is satisfied, astigmatism can be reasonably corrected. Also, a barrel-distorted image is photoelectrically converted by the image sensor into barrel-distorted image data. However, in the barrel-distorted image data, a process corresponding to a change of the image shape is electrically applied by an image processing means that is the signal processing system of the electronic imaging apparatus. By doing so, even when the image data finally output from the image processing means are reproduced by a display device, distortion is corrected and an image very similar in shape to the object is obtained.

Here, beyond the upper limit of Condition (21), notably in a value close to 1, distortion is optically well corrected. On the other hand, however, correction for astigmatism becomes difficult, which is unfavorable. Below the lower limit of Condition (21), the proportion of enlargement of the image periphery in the radial direction is extremely increased when image distortion due to distortion of the optical system is corrected by the image processing means. As a result, the degradation of sharpness of the image periphery becomes pronounced. When Condition (21) is satisfied, favorable correction for astigmatism is facilitated and the compatibility of the slim design of the zoom optical system with the design of the large aperture ratio (for example, brightness below F/2.8 at the wide-angle position) becomes possible.

Instead of satisfying Condition (21), it is more favorable to satisfy the following condition:

$$0.75 < y_{07}/(fw \cdot \tan \omega_{07w}) < 0.93 \quad (21')$$

Further, instead of satisfying Condition (21), it is much more favorable to satisfy the following condition:

$$0.80 < y_{07}/(fw \cdot \tan \omega_{07w}) < 0.92 \quad (21'')$$

The zoom optical system of the present invention is provided with (or satisfies) the conditions and the structural features mentioned above, and thereby even when the image sensor of high pixel density is used, favorable correction for aberration sufficiently accommodating this can be realized. Hence, the compatibility of the design of the large aperture ratio of the zoom optical system with the slim design can be achieved. In the zoom optical system of the present invention, the conditions and the structural features can be combined (or satisfied). In this case, favorable correction for aberration is achieved and in addition, a smaller-sized and slimmer design and the design of a larger aperture ratio become possible. The electronic imaging apparatus having the zoom optical system of the present invention is provided with the zoom optical system in which the small-sized and slim design and the design of the large aperture ratio are compatible, and thereby a high-function and compact design can be achieved.

In accordance with the drawings, the embodiments of the present invention will be explained below. The zoom optical system of each of the embodiments of the present invention comprises four lens units. Of these lens units, a first lens unit includes two lenses (a cemented doublet), a second lens unit includes three lenses (a single lens and a cemented doublet), a third lens unit includes one lens, and a fourth lens unit includes one lens. Also, the second lens unit may include four lenses (a single lens and a cemented triplet). The refracting power of one lens can be imparted to two lenses. In this case, although this is not described in the embodiments, one lens can be added to at least one of the four lens units. In an extreme case, the first lens unit includes three lenses, the second lens unit includes five lenses, the third lens unit includes two lenses, and the fourth lens unit includes two lenses. Also, two lenses may be a cemented lens or separate single lenses (for example, the first lens unit can be constructed with a cemented doublet and a single lens or with a cemented triplet).

As mentioned above, the zoom optical system is capable of providing the first lens unit with two or three lenses, the second lens unit with three to five lenses, the third lenses with one or two lenses, and the fourth lens unit with one or two lenses. Since one lens is added and thereby the number of lenses used for correcting aberration is increased, the design of the large aperture ratio is facilitated in a state where aberration is favorably corrected. Moreover, the radius of curvature of each of two lenses can be enlarged, and hence the thickness of each lens is not so large. As such, the optical system is not oversized.

Embodiment 1

Figure 1B:
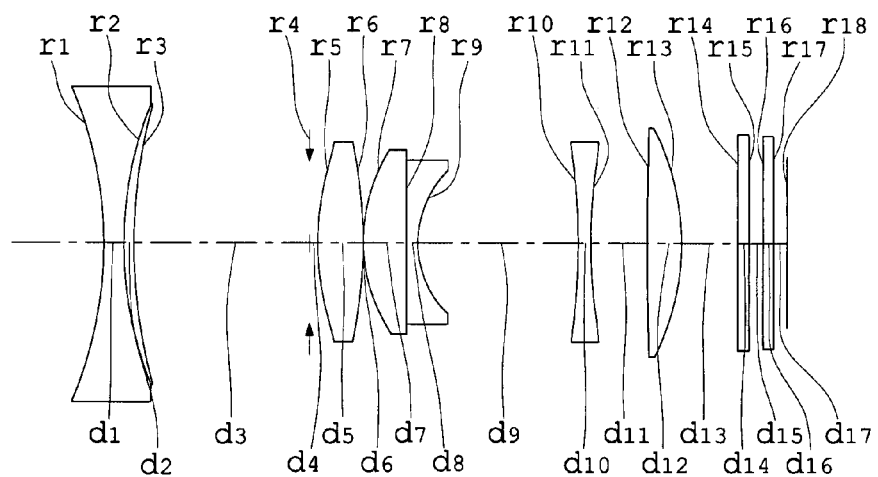
Figure 1C:
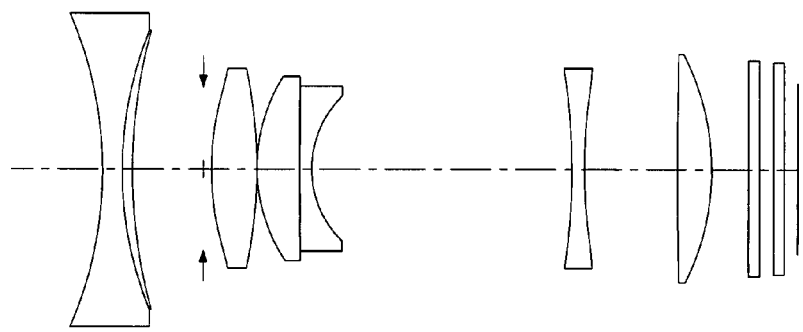
Figure 2A:
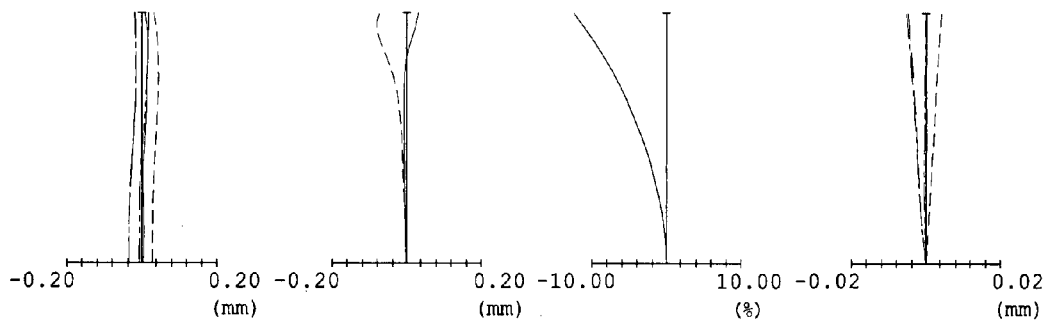
FIGS. 2A-2D, 2E-2H, and 2I-2L are diagrams showing aberration characteristics at wide-angle, middle, and telephoto positions, respectively, in infinite object point focusing of the zoom optical system of FIGS. 1A-1C.
Figure 2B:
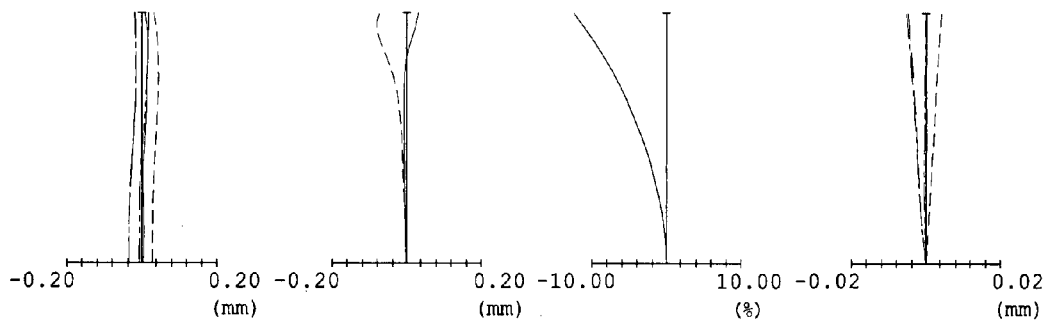
Figure 2C:
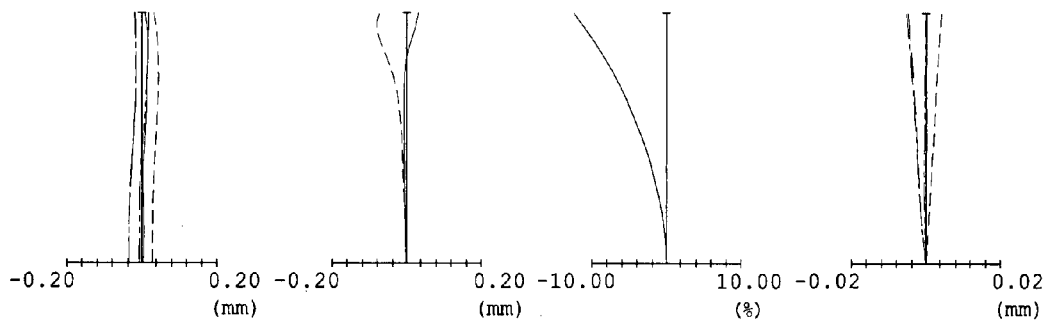
Figure 2D:
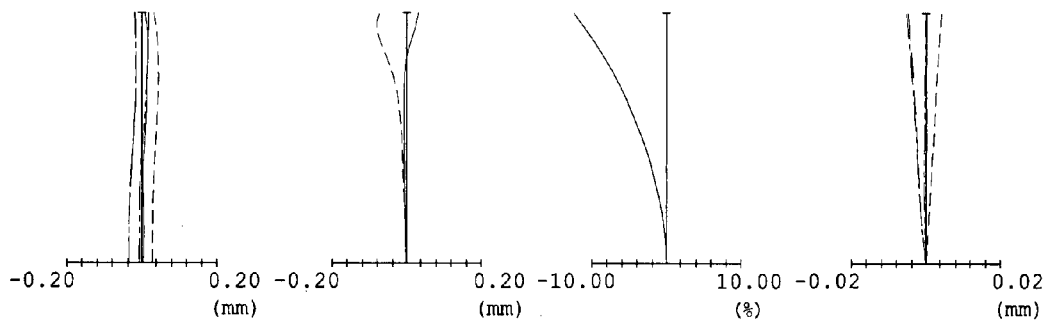
Figure 2E:
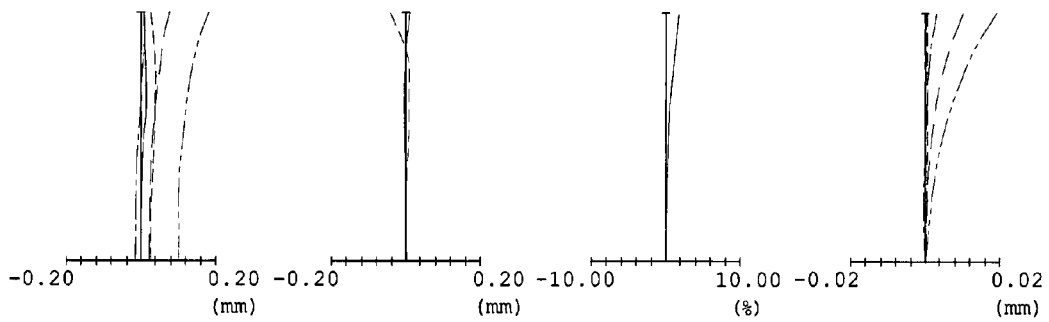
Figure 2F:
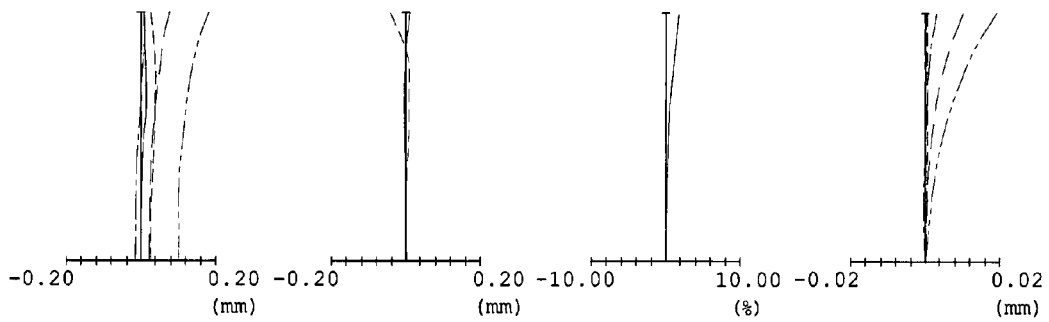
Figure 2G:
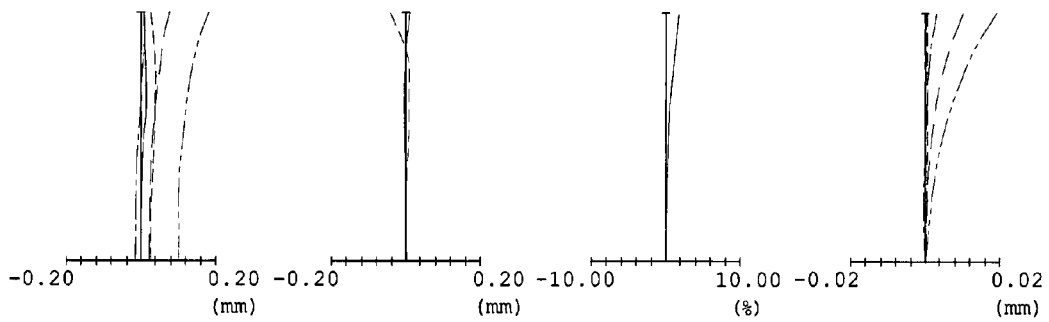
Figure 2H:
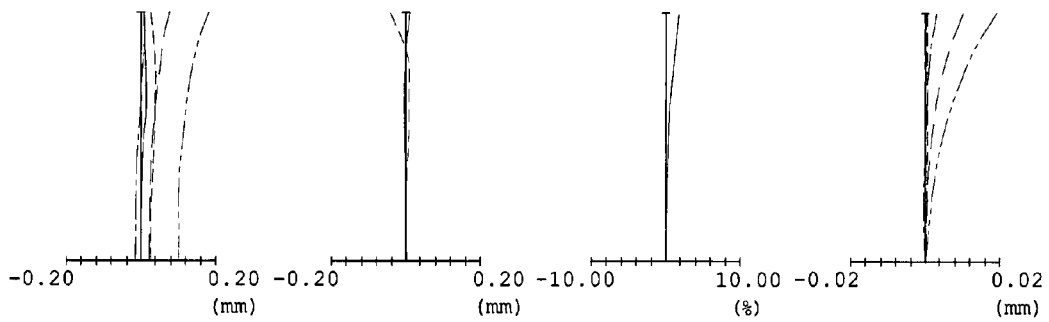
Figure 2I:
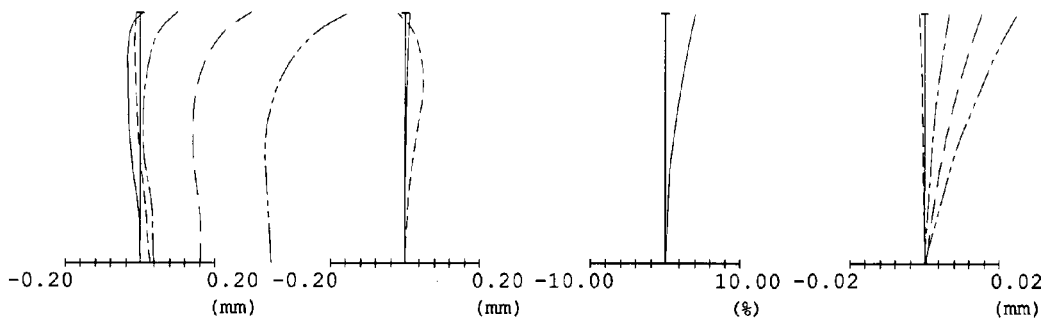
Figure 2J:
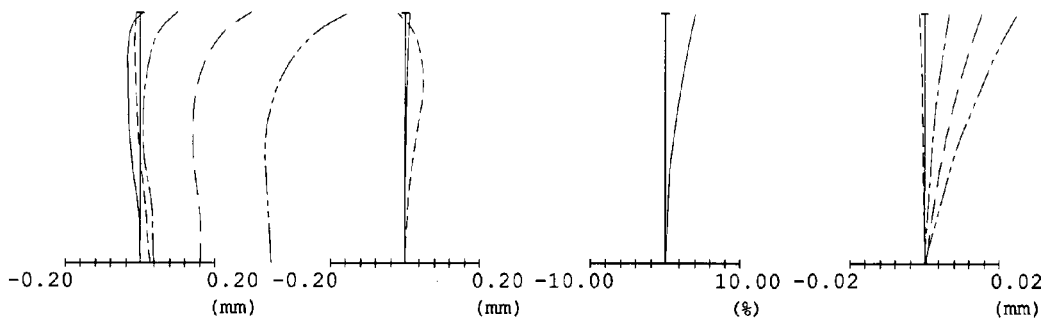
Figure 2K:
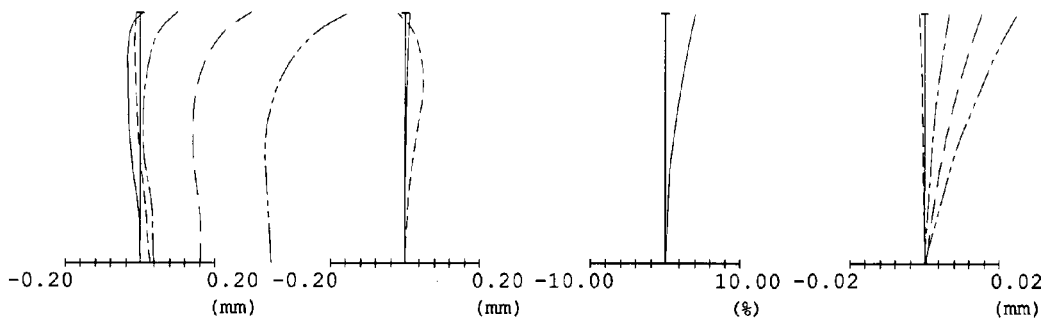
Figure 2L:
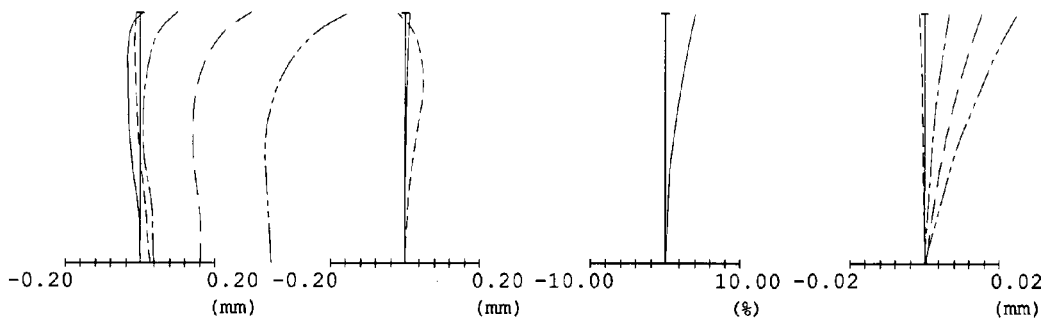

FIGS. 1A, 1B, and 1C are sectional views showing optical arrangements, developed along the optical axis, at wide-angle, middle, and telephoto positions, respectively, in infinite object point focusing of Embodiment 1 of the zoom optical system according to the present invention. FIGS. 2A-2D, 2E-2H, and 2I-2L are diagrams showing aberration characteristics at wide-angle, middle, and telephoto positions, respectively, in infinite object point focusing of the zoom optical system of FIGS. 1A-1C. In FIG. 1A, reference symbol I denotes the imaging surface of a CCD that is an electronic image sensor, S denotes an aperture stop, FL denotes a plane-parallel plate-shaped filter, and CG denotes a plane-parallel plate-shaped CCD cover glass.

The zoom optical system of Embodiment 1 has the lens units, the filter FL, the cover glass CG, and the CCD. (Also, the CCD may or may not be included in parts constituting the zoom optical system. The same holds for other embodiments.) The zoom optical system comprises, in order from the object side, a first lens unit G1 as the lens unit A, the aperture stop S, a second lens unit G2 as the lens unit B, a third lens unit G3 as the lens unit C, and a fourth lens unit G4 as the lens unit D.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22 and a biconcave lens L23 are cemented, and has positive refracting power as a whole. The third lens unit G3 includes a biconcave lens L31. The fourth lens unit G4 includes a biconvex lens L41. When the magnification is changed in the range from the wide-angle position to the telephoto position, the first lens unit G1 is moved back and forth along the optical axis in such a way that the first lens unit G1, after being initially moved toward the image side, is moved toward the object side. The second lens unit G2 is simply moved, together with the aperture stop S, along the optical axis toward the object side so that spacing between the first lens unit G1 and the second lens unit G2 is narrowed. In focusing on an object point separated at least 300 times the focal length at the wide-angle position, when the magnification is changed in the range from the wide-angle position to the telephoto position, the third lens unit G3 is moved back and forth along the optical axis in such a way that the third lens unit G3 is initially moved toward the image side to narrow the spacing between the third lens unit G3 and the fourth lens unit G4 and then is moved toward the object side. The fourth lens unit G4 is simply moved along the optical axis toward the image side. The third lens unit G3 and the fourth lens unit G4 are moved together while changing a relative spacing in focusing. In a state where the first lens unit G1 and the second lens unit G2 are fixed, when the third lens unit G3 and the fourth lens unit G4 are moved in order to focus the object point at a shorter distance, the spacing between the third lens unit G3 and the fourth lens unit G4 is narrowed.

Subsequently, numerical data of optical members constituting the zoom optical system of Embodiment 1 are shown below. In the numerical data of Embodiment 1, $r_1$, $r_2$, denote radii of curvature of surfaces of individual lenses; $d_1$, $d_2$, ... denote thicknesses of individual lenses or air spacings between them; $n_{d1}$, $n_{d2}$, ... denote refractive indices of individual lenses at the d line; $v_{d1}$, $v_{d2}$, ... denote Abbe's numbers of individual lenses; F denotes the focal length of the entire system of the zoom optical system; and fno denotes the F-number of the zoom optical system.

Also, when z is taken as the coordinate in the direction of the optical axis, h is taken as the coordinate normal to the optical axis, k represents a conic constant, $A_4$, $A_6$, $A_8$, and $A_{10}$ represent aspherical coefficients, and R represents the radius of curvature of a spherical component on the optical axis, the configuration of an aspherical surface is expressed by the following equation:

$$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (13)$$

These symbols are also used for the numerical data of other embodiments to be described later.

Numerical Data 1

| | | | | | | | |
|---|---|---|---|---|---|---|---|
| $r_1 =$ | −13.2566 (aspherical surface) | $d_1 =$ | 0.8000 | $n_{d1} =$ | 1.49700 | $v_{d1} =$ | 81.54 |
| $r_2 =$ | 13.1877 | $d_2 =$ | 0.4237 | $n_{d2} =$ | 1.63494 | $v_{d2} =$ | 23.22 |
| $r_3 =$ | 20.8972 (aspherical surface) | $d_3 =$ | D3 | | | | |
| $r_4 =$ | ∞ (stop) | $d_4 =$ | 0.3000 | | | | |
| $r_5 =$ | 8.6234 (aspherical surface) | $d_5 =$ | 1.8201 | $n_{d5} =$ | 1.83481 | $v_{d5} =$ | 42.71 |
| $r_6 =$ | −28.1231 (aspherical surface) | $d_6 =$ | 0.0791 | | | | |
| $r_7 =$ | 7.0624 (aspherical surface) | $d_7 =$ | 1.7619 | $n_{d7} =$ | 1.83481 | $v_{d7} =$ | 42.71 |
| $r_8 =$ | −462.1726 | $d_8 =$ | 0.4000 | $n_{d8} =$ | 1.80810 | $v_{d8} =$ | 22.76 |
| $r_9 =$ | 3.9333 | $d_9 =$ | D9 | | | | |
| $r_{10} =$ | −34.2928 (aspherical surface) | $d_{10} =$ | 0.5000 | $n_{d10} =$ | 1.52542 | $v_{d10} =$ | 55.78 |
| $r_{11} =$ | 22.6658 | $d_{11} =$ | D11 | | | | |
| $r_{12} =$ | 63.7715 (aspherical surface) | $d_{12} =$ | 1.3800 | $n_{d12} =$ | 1.83481 | $v_{d12} =$ | 42.31 |
| $r_{13} =$ | −9.6000 | $d_{13} =$ | D13 | | | | |
| $r_{14} =$ | ∞ | $d_{14} =$ | 0.5000 | $n_{d14} =$ | 1.54771 | $v_{d14} =$ | 62.84 |
| $r_{15} =$ | ∞ | $d_{15} =$ | 0.5000 | | | | |
| $r_{16} =$ | ∞ | $d_{16} =$ | 0.5000 | $n_{d16} =$ | 1.51633 | $v_{d16} =$ | 64.14 |
| $r_{17} =$ | ∞ | $d_{17} =$ | D17 | | | | |
| $r_{18} =$ | ∞ (imaging surface) | | | | | | |

Aspherical Coefficients

First surface $k = -2.8817$
$A_2 = 0$   $A_4 = 0$   $A_6 = 3.6881 \times 10^{-6}$   $A_8 = -5.5124 \times 10^{-8}$
$A_{10} = 0$ Third surface $k = -2.9323$
$A_2 = 0$   $A_4 = 3.6856 \times 10^{-5}$   $A_6 = 5.0066 \times 10^{-6}$   $A_8 = -5.9251 \times 10^{-8}$
$A_{10} = 0$ Fifth surface $k = -1.8270$
$A_2 = 0$   $A_4 = -3.4535 \times 10^{-4}$   $A_6 = -2.1823 \times 10^{-5}$   $A_8 = -7.8527 \times 10^{-8}$
$A_{10} = 0$ Sixth surface $k = -5.3587$
$A_2 = 0$   $A_4 = -3.7600 \times 10^{-4}$   $A_6 = -4.8554 \times 10^{-6}$   $A_8 = -2.1415 \times 10^{-7}$
$A_{10} = 0$ Seventh surface $k = 0.1274$
$A_2 = 0$   $A_4 = 8.3040 \times 10^{-5}$   $A_6 = 1.9928 \times 10^{-5}$   $A_8 = 5.0707 \times 10^{-7}$
$A_{10} = 8.1677 \times 10^{-9}$ Tenth surface $k = 57.7596$
$A_2 = 0$   $A_4 = -1.7412 \times 10^{-4}$   $A_6 = -4.6146 \times 10^{-6}$   $A_8 = 1.1872 \times 10^{-6}$
$A_{10} = 0$ Twelfth surface $k = 0$
$A_2 = 0$   $A_4 = -4.1049 \times 10^{-4}$   $A_6 = 3.1634 \times 10^{-6}$   $A_8 = 0$
$A_{10} = 0$ Refractive Indices Classified by Wavelengths in Medium Constituting Negative Lens $L_{AN}$ nd = 1.496999   nC = 1.495136   nF = 1.501231   ng = 1.504506
nh = 1.507205

Refractive Indices Classified by Wavelengths in Medium Constituting Positive Lens $L_{AP}$ nd = 1.634940   nC = 1.627290   nF = 1.654640   ng = 1.672908
nh = 1.689873

Zoom Data (when D0 (Distance from Object to First Surface) is Infinite)

| | Wide-angle | Middle | Telephoto |
|---|---|---|---|
| F | 6.42001 | 11.01031 | 18.48960 |
| fno | 1.8604 | 2.4534 | 3.4040 |
| D0 | ∞ | ∞ | ∞ |
| D3 | 14.77955 | 7.26463 | 2.92947 |
| D9 | 2.20000 | 6.46215 | 10.54460 |
| D11 | 2.38783 | 2.27230 | 3.76136 |
| D13 | 3.16783 | 2.30230 | 1.60000 |
| D17 | 0.50014 | 0.50001 | 0.49987 |

Embodiment 2

Figure 3A:
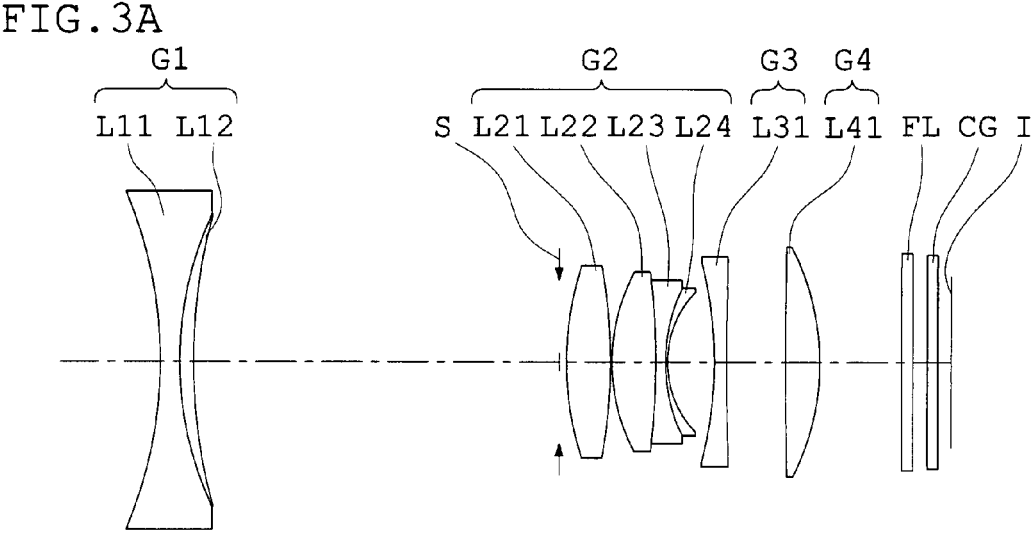
FIGS. 3A, 3B, and 3C are sectional views showing optical arrangements, developed along the optical axis, at wide-angle, middle, and telephoto positions, respectively, in infinite object point focusing of Embodiment 2 of the zoom optical system according to the present invention.
Figure 3B:
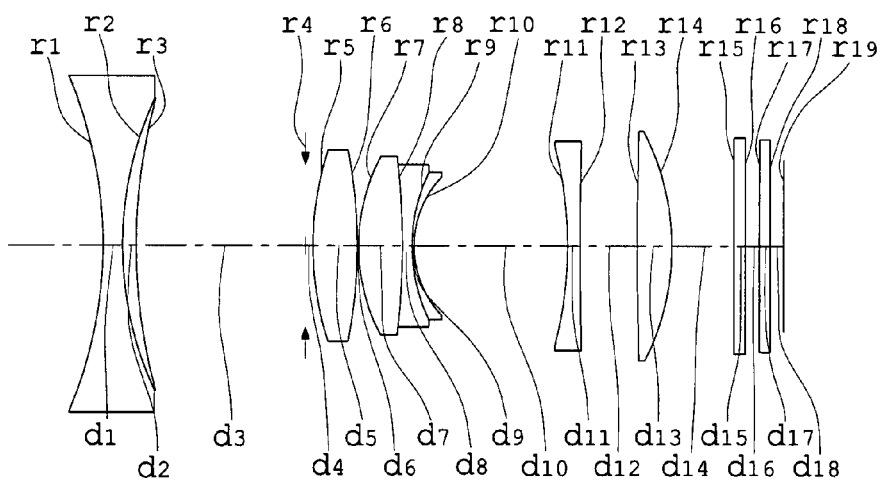
Figure 3C:
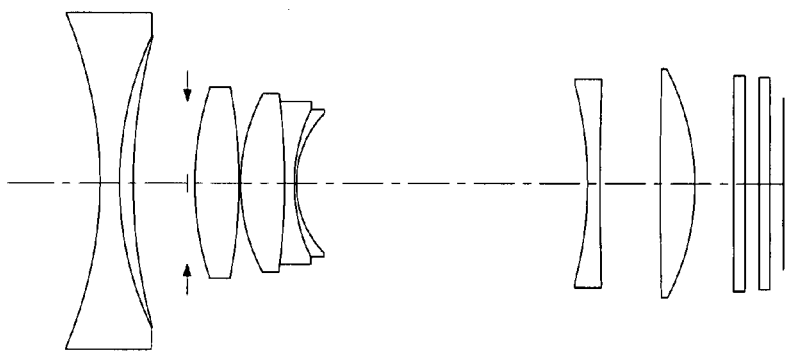

FIGS. 3A, 3B, and 3C are sectional views showing optical arrangements, developed along the optical axis, at wide-angle, middle, and telephoto positions, respectively, in infinite object point focusing of Embodiment 2 of the zoom optical system according to the present invention. FIGS. 4A-4D, 4E-4H, and 4I-4L are diagrams showing aberration characteristics at wide-angle, middle, and telephoto positions, respectively, in infinite object point focusing of the zoom optical system of FIGS. 3A-3C. In FIG. 3A, again, reference symbol I denotes the imaging surface of a CCD that is an electronic image sensor, S denotes an aperture stop, FL denotes a plane-parallel plate-shaped filter, and CG denotes a plane-parallel plate-shaped CCD cover glass.

The zoom optical system of Embodiment 2 has the lens units, the filter FL, the cover glass CG, and the CCD. The zoom optical system comprises, in order from the object side, a first lens unit G1 as the lens unit A, the aperture stop S, a second lens unit G2 as the lens unit B, a third lens unit G3 as the lens unit C, and a fourth lens unit G4 as the lens unit is D.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22, a biconcave lens L23, and a negative meniscus lens L24 with a convex surface facing the object side are cemented, and has positive refracting power as a whole. The third lens unit G3 includes a biconcave lens L31. The fourth lens unit G4 includes a biconvex lens L41.

When the magnification is changed in the range from the wide-angle position to the telephoto position, the first lens unit G1 is moved back and forth along the optical axis in such a way that the first lens unit G1, after being initially moved toward the image side, is moved toward the object side. The second lens unit G2 is simply moved, together with the aperture stop S, along the optical axis toward the object side so that spacing between the first lens unit G1 and the second lens unit G2 is narrowed. In focusing on an object point separated at least 300 times the focal length at the wide-angle position, when the magnification is changed in the range from the wide-angle position to the telephoto position, the third lens unit G3 is simply moved along the optical axis toward the image side, and the fourth lens unit G4 is simply moved along the optical axis toward the image side in such a way that the spacing between the third lens unit G3 and the fourth lens unit G4 is kept constant. Also, the third lens unit G3 and the fourth lens unit G4 are moved together in focusing.

Subsequently, numerical data of optical members constituting the zoom optical system of Embodiment 2 are shown below.

Numerical data 2

| | | | |
|---|---|---|---|
| $r_1 = -12.3442$ (aspherical surface) | $d_1 = 0.8000$ | $n_{d1} = 1.49700$ | $v_{d1} = 81.54$ |
| $r_2 = 13.4553$ | $d_2 = 0.5314$ | $n_{d2} = 1.63494$ | $v_{d2} = 23.22$ |
| $r_3 = 28.5230$ (aspherical surface) | $d_3 = D3$ | | |
| $r_4 = \infty$ (stop) | $d_4 = 0.3000$ | | |
| $r_5 = 9.0189$ (aspherical surface) | $d_5 = 1.7947$ | $n_{d5} = 1.77377$ | $v_{d5} = 47.18$ |
| $r_6 = -17.3973$ (aspherical surface) | $d_6 = 0.0791$ | | |
| $r_7 = 7.2281$ | $d_7 = 1.7188$ | $n_{d7} = 1.81600$ | $v_{d7} = 46.62$ |
| $r_8 = -40.0282$ | $d_8 = 0.4000$ | $n_{d8} = 1.76182$ | $v_{d8} = 23.22$ |
| $r_9 = 5.8000$ | $d_9 = 0.1000$ | $n_{d9} = 1.63494$ | $v_{d9} = 23.22$ |
| $r_{10} = 3.3167$ (aspherical surface) | $d_{10} = D10$ | | |
| $r_{11} = -17.7768$ (aspherical surface) | $d_{11} = 0.5000$ | $n_{d11} = 1.49700$ | $v_{d11} = 81.54$ |
| $r_{12} = 390.0428$ | $d_{12} = D12$ | | |
| $r_{13} = 75.0584$ (aspherical surface) | $d_{13} = 1.3500$ | $n_{d13} = 1.83481$ | $v_{d13} = 42.71$ |
| $r_{14} = -9.4000$ | $d_{14} = D14$ | | |
| $r_{15} = \infty$ | $d_{15} = 0.5000$ | $n_{d15} = 1.54771$ | $v_{d15} = 62.84$ |
| $r_{16} = \infty$ | $d_{16} = 0.5000$ | | |
| $r_{17} = \infty$ | $d_{17} = 0.5000$ | $n_{d17} = 1.51633$ | $v_{d17} = 64.14$ |
| $r_{18} = \infty$ | $d_{18} = D18$ | | |
| $r_{19} = \infty$ (imaging surface) | | | |

Aspherical Coefficients

First surface $k = -6.7681$
$A_2 = 0$    $A_4 = 0$    $A_6 = 1.0812 \times 10^{-6}$    $A_8 = -1.3937 \times 10^{-8}$
$A_{10} = 0$ Third surface $k = -7.1823$
$A_2 = 0$    $A_4 = 2.5037 \times 10^{-4}$    $A_6 = 4.0271 \times 10^{-7}$    $A_8 = -1.3487 \times 10^{-8}$
$A_{10} = 0$ Fifth surface $k = -1.0055$
$A_2 = 0$    $A_4 = -2.1413 \times 10^{-4}$    $A_6 = 0$    $A_8 = 0$
$A_{10} = 0$ Sixth surface $k = -43.9099$
$A_2 = 0$    $A_4 = -1.2952 \times 10^{-4}$    $A_6 = 0$    $A_8 = 0$
$A_{10} = 0$ -continued Tenth surface k = 0
$A_2 = 0$     $A_4 = -3.6910 \times 10^{-3}$     $A_6 = 8.6183 \times 10^{-5}$     $A_8 = -2.7146 \times 10^{-5}$
$A_{10} = 0$
Eleventh surface k = 0
$A_2 = 0$     $A_4 = -4.8312 \times 10^{-4}$     $A_6 = 1.1957 \times 10^{-5}$     $A_8 = 0$
$A_{10} = 0$
Thirteenth surface k = 0
$A_2 = 0$     $A_4 = -3.7266 \times 10^{-4}$     $A_6 = 0$     $A_8 = 0$
$A_{10} = 0$ Refractive Indices Classified by Wavelengths in Medium Constituting Negative Lens $L_{AN}$ n d = 1.496999     n C = 1.495136     n F = 1.501231     n g = 1.504506
n h = 1.507205

Refractive Indices Classified by Wavelengths in Medium Constituting Positive Lens $L_{AP}$ n d = 1.634940     n C = 1.627290     n F = 1.654640     n g = 1.672908
n h = 1.689873

ZOOM Data (when D0 (Distance from Object to First Surface) is Infinite)

|     | Wide-angle | Middle   | Telephoto |
| --- | ---------- | -------- | --------- |
| F   | 6.42000    | 11.01025 | 18.48952  |
| fno | 1.8778     | 2.4831   | 3.4338    |
| D0  | ∞          | ∞        | ∞         |
| D3  | 14.88305   | 6.97580  | 2.28964   |
| D10 | 1.89485    | 6.19550  | 11.88154  |
| D12 | 2.38679    | 2.38679  | 2.38679   |
| D14 | 3.26126    | 2.53410  | 1.60000   |
| D18 | 0.50009    | 0.49998  | 0.49965   |

Embodiment 3

Figure 5A:
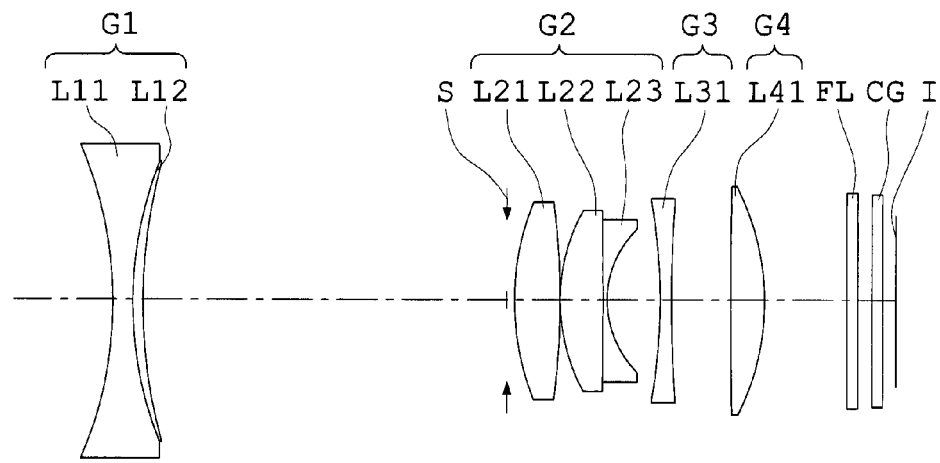
FIGS. 5A, 5B, and 5C are sectional views showing optical arrangements, developed along the optical axis, at wide-angle, middle, and telephoto positions, respectively, in infinite object point focusing of Embodiment 3 of the zoom optical system according to the present invention.
Figure 5B:
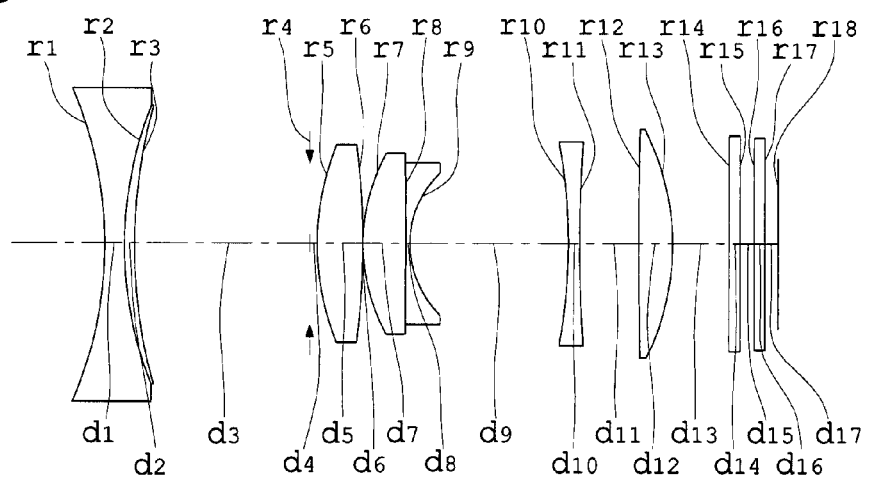
Figure 5C:
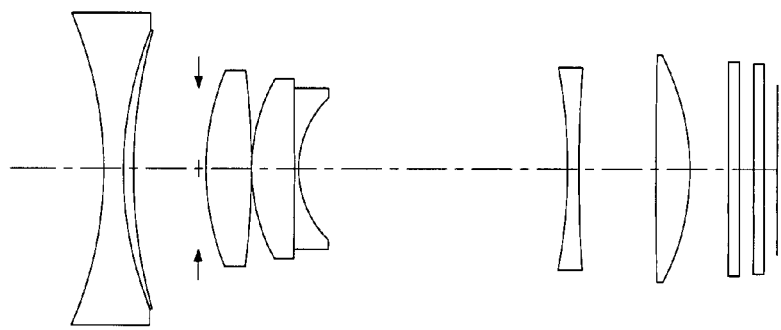

FIGS. 5A, 5B, and 5C are sectional views showing optical arrangements, developed along the optical axis, at wide-angle, middle, and telephoto positions, respectively, in infinite object point focusing of Embodiment 3 of the zoom optical system according to the present invention. FIGS. 6A-6D, 6E-6H, and 6I-6L are diagrams showing aberration characteristics at wide-angle, middle, and telephoto positions, respectively, in infinite object point focusing of the zoom optical system of FIGS. 5A-5C. In FIG. 5A, again, reference symbol I denotes the imaging surface of a CCD that is an electronic image sensor, S denotes an aperture stop, FL denotes a plane-parallel plate-shaped filter, and CG denotes a plane-parallel plate-shaped CCD cover glass.

The zoom optical system of Embodiment 3 has the lens units, the filter FL, the cover glass CG, and the CCD. The zoom optical system comprises, in order from the object side, a first lens unit G1 as the lens unit A, the aperture stop S, a second lens unit G2 as the lens unit B, a third lens unit G3 as the lens unit C, and a fourth lens unit G4 as the lens unit D.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22 and a biconcave lens L23 are cemented, and has positive refracting power as a whole. The third lens unit G3 includes a biconcave lens L31. The fourth lens unit G4 includes a biconvex lens L41.

When the magnification is changed in the range from the wide-angle position to the telephoto position, the first lens unit G1 is initially moved along the optical axis toward the image side, and when reaching the middle position, is stopped. The second lens unit G2 is simply moved, together with the aperture stop S, along the optical axis toward the object side so that spacing between the first lens unit G1 and the second lens unit G2 is narrowed. In focusing on an object point separated at least 300 times the focal length at the wide-angle position, when the magnification is changed in the range from the wide-angle position to the telephoto position, the third lens unit G3 is initially moved along the optical axis toward the image side and when reaching the middle position, is stopped. The fourth lens unit G4 is simply moved along the optical axis toward the image side so that the spacing between the third lens unit G3 and the fourth lens unit G4 is widened.

Subsequently, numerical data of optical members constituting the zoom optical system of Embodiment 3 are shown below.

Numerical Data 3

$r_1 = -13.9027$     $d_1 = 0.8000$     $n_{d1} = 1.49700$     $\nu_{d1} = 81.54$
(aspherical surface)
$r_2 = 14.2424$     $d_2 = 0.3849$     $n_{d2} = 1.63494$     $\nu_{d2} = 23.22$
$r_3 = 22.7579$     $d_3 = D3$
(aspherical surface)
$r_4 = \infty$ (stop)     $d_4 = 0.3000$
$r_5 = 8.4540$     $d_5 = 1.8463$     $n_{d5} = 1.83481$     $\nu_{d5} = 42.71$
(aspherical surface)
$r_6 = -19.5689$     $d_6 = 0.0791$
(aspherical surface)
$r_7 = 6.5193$     $d_7 = 1.7246$     $n_{d7} = 1.88300$     $\nu_{d7} = 40.76$
$r_8 = -3802.8463$     $d_8 = 0.1500$     $n_{d8} = 1.83917$     $\nu_{d8} = 23.86$
$r_9 = 3.3456$     $d_9 = D9$ -continued (aspherical surface)
$r_{10} = -30.3101$  $d_{10} = 0.5000$  $n_{d10} = 1.73077$  $v_{d10} = 40.51$
(aspherical surface)
$r_{11} = 54.2118$   $d_{11} = D11$
$r_{12} = 85.0269$   $d_{12} = 1.3296$  $n_{d12} = 1.88300$  $v_{d12} = 40.76$
(aspherical surface)
$r_{13} = -9.6000$   $d_{13} = D13$
$r_{14} = \infty$    $d_{14} = 0.5000$  $n_{d14} = 1.54771$  $v_{d14} = 62.84$
$r_{15} = \infty$    $d_{15} = 0.5000$
$r_{16} = \infty$    $d_{16} = 0.5000$  $n_{d16} = 1.51633$  $v_{d16} = 64.14$
$r_{17} = \infty$    $d_{17} = D17$
$r_{18} = \infty$ (imaging surface)

Aspherical Coefficients

First surface $k = -2.5695$
$A_2 = 0$    $A_4 = 0$    $A_6 = 4.6879 \times 10^{-6}$    $A_8 = -5.0343 \times 10^{-8}$
$A_{10} = 0$
Third surface $k = -11.8389$
$A_2 = 0$    $A_4 = 1.1100 \times 10^{-4}$    $A_6 = 4.8835 \times 10^{-6}$    $A_8 = -2.2353 \times 10^{-8}$
$A_{10} = 0$
Fifth surface $k = -1.4160$
$A_2 = 0$    $A_4 = -2.2154 \times 10^{-4}$    $A_6 = 1.6991 \times 10^{-6}$    $A_8 = 0$
$A_{10} = 0$
Sixth surface $k = -63.5361$
$A_2 = 0$    $A_4 = -2.0102 \times 10^{-4}$    $A_6 = 2.9251 \times 10^{-6}$    $A_8 = 0$
$A_{10} = 0$
Ninth surface $k = -0.1169$
$A_2 = 0$    $A_4 = -2.6340 \times 10^{-3}$    $A_6 = 1.0018 \times 10^{-4}$    $A_8 = -1.8484 \times 10^{-5}$
$A_{10} = 0$
Tenth surface $k = 0$
$A_2 = 0$    $A_4 = -3.8356 \times 10^{-4}$    $A_6 = 7.5898 \times 10^{-6}$    $A_8 = 0$
$A_{10} = 0$
Twelfth surface $k = 0$
$A_2 = 0$    $A_4 = -3.1306 \times 10^{-4}$    $A_6 = 0$    $A_8 = 0$
$A_{10} = 0$ Refractive Indices Classified by Wavelengths in Medium Constituting Negative Lens $L_{AN}$ $nd = 1.496999$    $nC = 1.495136$    $nF = 1.501231$    $ng = 1.504506$
$nh = 1.507205$ Refractive Indices Classified by Wavelengths in Medium Constituting Positive Lens $L_{AP}$ $nd = 1.634940$    $nC = 1.627290$    $nF = 1.654640$    $ng = 1.672908$
$nh = 1.689873$ Zoom Data (when D0 (Distance from Object to First Surface) is Infinite)

|     | Wide-angle | Middle   | Telephoto |
|-----|------------|----------|-----------|
| F   | 6.41996    | 11.01022 | 18.48913  |
| fno | 1.8794     | 2.4961   | 3.4414    |
| D0  | $\infty$   | $\infty$ | $\infty$  |
| D3  | 15.05021   | 7.39373  | 2.69994   |
| D9  | 2.00138    | 6.40192  | 11.09864  |
| D11 | 2.46286    | 2.33064  | 3.08616   |
| D13 | 3.37105    | 2.42127  | 1.64550   |
| D17 | 0.50001    | 0.49990  | 0.49994   |

Embodiment 4

Figure 7A:
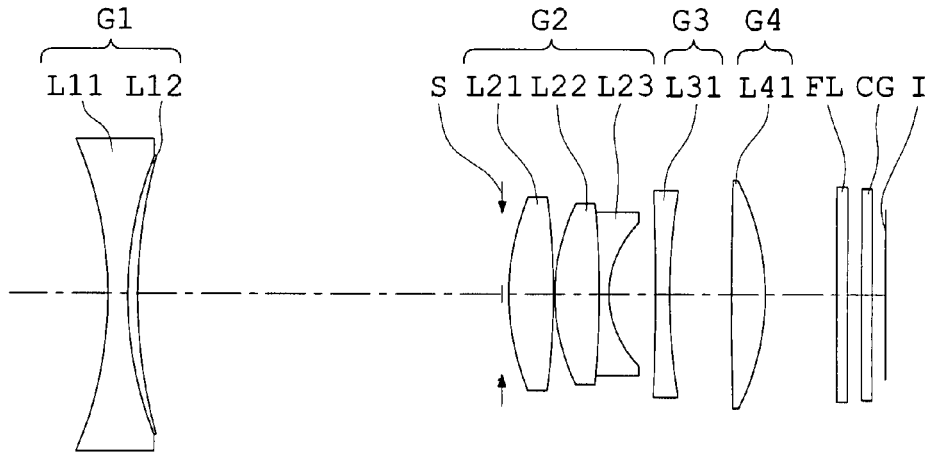
FIGS. 7A, 7B, and 7C are sectional views showing optical arrangements, developed along the optical axis, at wide-angle, middle, and telephoto positions, respectively, in infinite object point focusing of Embodiment 4 of the zoom optical system according to the present invention.
Figure 7B:
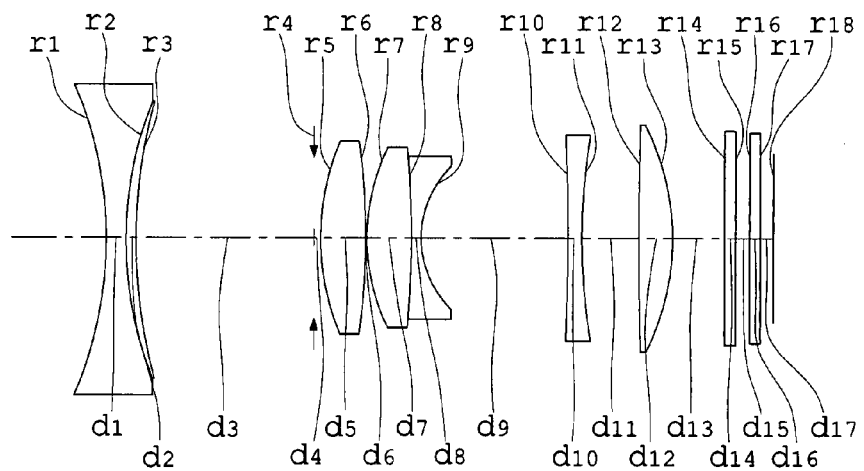
Figure 7C:
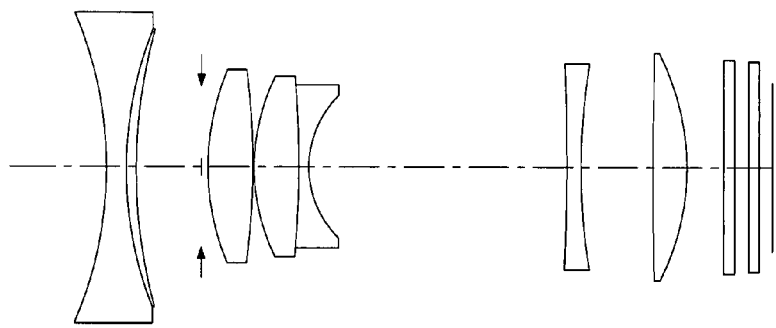

FIGS. 7A, 7B, and 7C are sectional views showing optical arrangements, developed along the optical axis, at wide-angle, middle, and telephoto positions, respectively, in infinite object point focusing of Embodiment 4 of the zoom optical system according to the present invention. FIGS. 8A-8D, 8E-8H, and 8I-8L are diagrams showing aberration characteristics at wide-angle, middle, and telephoto positions, respectively, in infinite object point focusing of the zoom optical system of FIGS. 7A-7C. In FIG. 7A, again, reference symbol I denotes the imaging surface of a CCD that is an electronic image sensor, S denotes an aperture stop, FL denotes a plane-parallel plate-shaped filter, and CG denotes a plane-parallel plate-shaped CCD cover glass.

The zoom optical system of Embodiment 4 has the lens units, the filter FL, the cover glass CG, and the CCD. The zoom optical system comprises, in order from the object side, a first lens unit G1 as the lens unit A, the aperture stop S, a second lens unit G2 as the lens unit B, a third lens unit G3 as the lens unit C, and a fourth lens unit G4 as the lens unit D.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22 and a biconcave lens L23 are cemented, and has positive refracting power as a whole. The third lens unit G3 includes a biconcave lens L31. The fourth lens unit G4 includes a biconvex lens L41.

When the magnification is changed in the range from the wide-angle position to the telephoto position, the first lens unit G1 is moved along the optical axis toward the image side, and the second lens unit is simply moved, together with the aperture stop S, along the optical axis toward the object side so that spacing between the first lens unit G1 and the second lens unit G2 is narrowed. In focusing on an object point separated at least 300 times the focal length at the wide-angle position, when the magnification is changed in the range from the wide-angle position to the telephoto position, the third lens unit G3 is moved back and forth along the optical axis in such a way that the third lens unit G3 is initially moved toward the image side and then is moved toward the object side. The fourth lens unit G4 is simply moved along the optical axis toward the image side. The third lens unit G3 and the fourth lens unit G4 are moved together while changing a relative spacing in focusing. In a state where the first lens unit G1 and the second lens unit G2 are fixed, when the third lens unit G3 and the fourth lens unit G4 are moved in order to focus the object point at a shorter distance, the spacing between the third lens unit G3 and the fourth lens unit G4 is narrowed.

Subsequently, numerical data of optical members constituting the zoom optical system of Embodiment 4 are shown below.

Numerical Data 4

| | | | |
|---|---|---|---|
| $r_1 = -13.7119$ (aspherical surface) | $d_1 = 0.8000$ | $n_{d1} = 1.49700$ | $v_{d1} = 81.54$ |
| $r_2 = 15.4002$ | $d_2 = 0.3349$ | $n_{d2} = 1.63494$ | $v_{d6} = 23.22$ |
| $r_3 = 22.7796$ (aspherical surface) | $d_3 = D3$ | | |
| $r_4 = \infty$ (stop) | $d_4 = 0.3000$ | | |
| $r_5 = 7.7949$ (aspherical surface) | $d_5 = 1.8356$ | $n_{d5} = 1.83481$ | $v_{d5} = 42.71$ |
| $r_6 = -25.0309$ (aspherical surface) | $d_6 = 0.0791$ | | |
| $r_7 = 7.5236$ | $d_7 = 1.7065$ | $n_{d7} = 1.88300$ | $v_{d7} = 40.76$ |
| $r_8 = -46.0680$ | $d_8 = 0.5000$ | $n_{d8} = 1.83917$ | $v_{d8} = 23.86$ |
| $r_9 = 3.5999$ (aspherical surface) | $d_9 = D9$ | | |
| $r_{10} = -293.7224$ (aspherical surface) | $d_{10} = 0.5000$ | $n_{d10} = 1.73077$ | $v_{d10} = 40.51$ |
| $r_{11} = 19.9208$ | $d_{11} = D11$ | | |
| $r_{12} = 68.7493$ (aspherical surface) | $d_{12} = 1.3578$ | $n_{d12} = 1.88300$ | $v_{d12} = 40.76$ |
| $r_{13} = -9.6000$ | $d_{13} = D13$ | | |
| $r_{14} = \infty$ | $d_{14} = 0.5000$ | $n_{d14} = 1.54771$ | $v_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $v_{d16} = 64.14$ |
| $r_{17} = \infty$ | $d_{17} = d17$ | | |
| $r_{18} = \infty$ (imaging surface) | | | |

Aspherical Coefficients

First surface $k = 1.6574$
$A_2 = 0$    $A_4 = 0$    $A_6 = 1.3203 \times 10^{-5}$    $A_8 = -1.2899 \times 10^{-7}$
$A_{10} = 0$ Third surface $k = -10.1025$
$A_2 = 0$    $A_4 = -8.1196 \times 10^{-5}$    $A_6 = 1.2184 \times 10^{-5}$    $A_8 = -9.7163 \times 10^{-8}$
$A_{10} = 0$ Fifth surface $k = -1.1112$
$A_2 = 0$    $A_4 = -1.2637 \times 10^{-4}$    $A_6 = -1.1430 \times 10^{-6}$    $A_8 = 0$
$A_{10} = 0$ Sixth surface $k = -82.5216$
$A_2 = 0$    $A_4 = -1.6302 \times 10^{-4}$    $A_6 = 1.9882 \times 10^{-6}$    $A_8 = 0$
$A_{10} = 0$ Ninth surface $k = 0.0311$
$A_2 = 0$    $A_4 = -1.6562 \times 10^{-3}$    $A_6 = 5.6636 \times 10^{-5}$    $A_8 = -1.5248 \times 10^{-5}$
$A_{10} = 0$ Tenth surface $k = 0$
$A_2 = 0$    $A_4 = -4.2171 \times 10^{-4}$    $A_6 = 1.3121 \times 10^{-5}$    $A_8 = 0$
$A_{10} = 0$ Twelfth surface $k = 0$
$A_2 = 0$    $A_4 = -2.7551 \times 10^{-4}$    $A_6 = 0$    $A_8 = 0$
$A_{10} = 0$ Refractive Indices Classified by Wavelengths in Medium Constituting Negative Lens $L_{AN}$

| | | | |
|---|---|---|---|
| nd = 1.496999 | nC = 1.495136 | nF = 1.501231 | ng = 1.504506 |
| nh = 1.507205 | | | |

Refractive Indices Classified by Wavelengths in Medium Constituting Positive Lens $L_{AP}$

| | | | |
|---|---|---|---|
| nd = 1.634940 | nC = 1.627290 | nF = 1.654640 | ng = 1.672908 |
| nh = 1.689873 | | | |

Zoom Data (when D0 (Distance from Object to First Surface) is Infinite)

| | Wide-angle | Middle | Telephoto |
|---|---|---|---|
| F | 6.41994 | 11.01010 | 18.48940 |
| fno | 1.9985 | 2.6417 | 3.6284 |
| D0 | ∞ | ∞ | ∞ |
| D3 | 15.17457 | 7.44838 | 2.70819 |
| D9 | 1.90216 | 6.00854 | 10.63598 |
| D11 | 2.52277 | 2.40859 | 3.03504 |
| D13 | 2.98667 | 2.17222 | 1.60000 |
| D17 | 0.50000 | 0.50006 | 0.49954 |

Embodiment 5

Figure 9A:
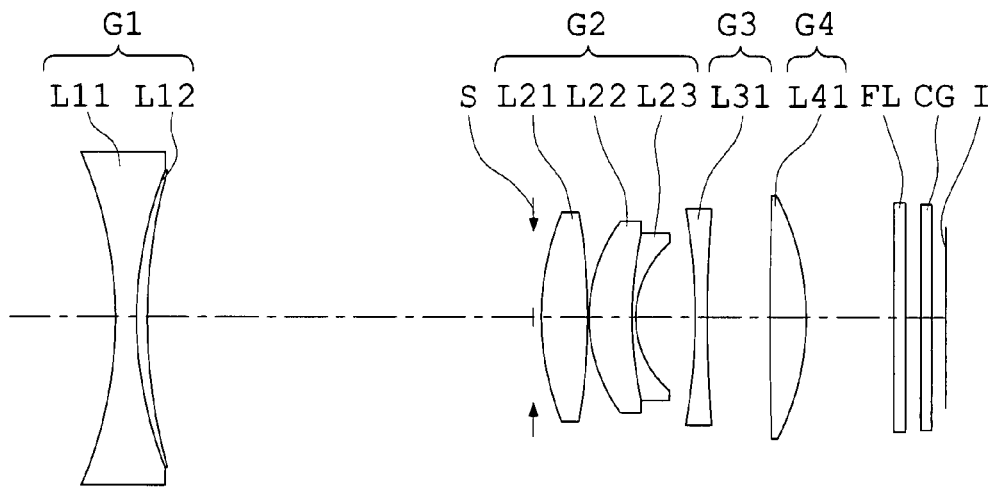
FIGS. 9A, 9B, and 9C are sectional views showing optical arrangements, developed along the optical axis, at wide-angle, middle, and telephoto positions, respectively, in infinite object point focusing of Embodiment 5 of the zoom optical system according to the present invention.
Figure 9B:
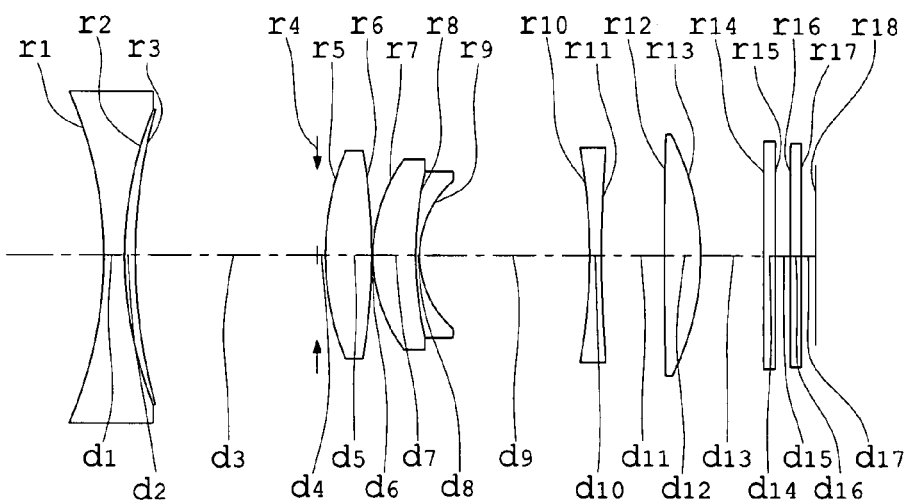
Figure 9C:
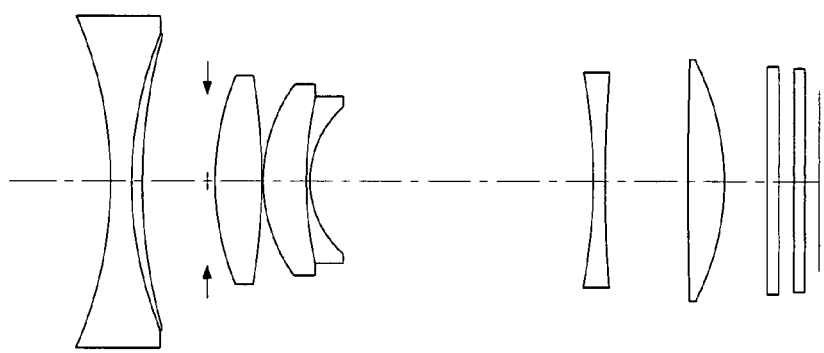

FIGS. 9A, 9B, and 9C are sectional views showing optical arrangements, developed along the optical axis, at wide-angle, middle, and telephoto positions, respectively, in infinite object point focusing of Embodiment 5 of the zoom optical system according to the present invention. FIGS. 10A-10D, 10E-10H, and 10I-10L are diagrams showing aberration characteristics at wide-angle, middle, and telephoto positions, respectively, in infinite object point focusing of the zoom optical system of FIGS. 9A-9C. In FIG. 9A, again, reference symbol I denotes the imaging surface of a CCD that is an electronic image sensor, S denotes an aperture stop, FL denotes a plane-parallel plate-shaped filter, and CG denotes a plane-parallel plate-shaped CCD cover glass.

The zoom optical system of Embodiment 5 has the lens units, the filter FL, the cover glass CG, and the CCD. The zoom optical system comprises, in order from the object side, a first lens unit G1 as the lens unit A, the aperture stop S, a second lens unit G2 as the lens unit B, a third lens unit G3 as the lens unit C, and a fourth lens unit G4 as the lens unit D.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22 and a biconcave lens L23 are cemented, and has positive refracting power as a whole. The third lens unit G3 includes a biconcave lens L31. The fourth lens unit G4 includes a biconvex lens L41.

When the magnification is changed in the range from the wide-angle position to the telephoto position, the first lens unit G1 is moved along the optical axis toward the image side, and the second lens unit is simply moved, together with the aperture stop S, along the optical axis toward the object side so that spacing between the first lens unit G1 and the second lens unit G2 is narrowed. In focusing on an object point separated at least 300 times the focal length at the wide-angle position, when the magnification is changed in the range from the wide-angle position to the telephoto position, the third lens unit G3 is initially moved along the optical axis toward the image side, and when reaching the middle position, is stopped. The fourth lens unit G4 is simply moved along the optical axis toward the image side so as to keep the spacing the third lens unit G3 and the fourth lens unit G4 constant until it reaches the middle position and to widen the spacing between them after reaching the middle position.

Subsequently, numerical data of optical members constituting the zoom optical system of Embodiment 5 are shown below.

Numerical Data 5

| | | | |
|---|---|---|---|
| $r_1 = -12.9349$ (aspherical surface) | $d_1 = 0.8000$ | $n_{d1} = 1.49700$ | $v_{d1} = 81.54$ |
| $r_2 = 14.0068$ | $d_2 = 0.4202$ | $n_{d2} = 1.63494$ | $v_{d2} = 23.22$ |
| $r_3 = 26.1436$ (aspherical surface) | $d_3 = D3$ | | |
| $r_4 = \infty$ (stop) | $d_4 = 0.3000$ | | |
| $r_5 = 9.3008$ (aspherical surface) | $d_5 = 1.7362$ | $n_{d5} = 1.83481$ | $v_{d5} = 42.71$ |
| $r_6 = -22.3575$ (aspherical surface) | $d_6 = 0.0791$ | | |
| $r_7 = 5.7732$ | $d_7 = 1.5976$ | $n_{d7} = 2.04000$ | $v_{d7} = 40.00$ |
| $r_8 = 12.2011$ | $d_8 = 0.1500$ | $n_{d8} = 1.90680$ | $v_{d8} = 21.15$ |
| $r_9 = 3.2973$ (aspherical surface) | $d_9 = D9$ | | |
| $r_{10} = -28.7396$ (aspherical surface) | $d_{10} = 0.5000$ | $n_{d10} = 1.73077$ | $v_{d10} = 40.51$ |
| $r_{11} = 57.8428$ | $d_{11} = D11$ | | |
| $r_{12} = 88.1385$ (aspherical surface) | $d_{12} = 1.3300$ | $n_{d12} = 1.88300$ | $v_{d12} = 40.76$ |
| $r_{13} = -9.6000$ | $d_{13} = D13$ | | |
| $r_{14} = \infty$ | $d_{14} = 0.5000$ | $n_{d14} = 1.54771$ | $v_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $v_{d16} = 64.14$ |
| $r_{17} = \infty$ | $d_{17} = D17$ | | |
| $r_{18} = \infty$ (imaging surface) | | | |

Aspherical Coefficients

First surface $k = -6.5076$
$A_2 = 0$   $A_4 = 0$   $A_6 = 7.3145 \times 10^{-7}$   $A_8 = 3.2389 \times 10^{-9}$
$A_{10} = 0$ Third surface $k = -10.1897$
$A_2 = 0$   $A_4 = 2.5563 \times 10^{-4}$   $A_6 = -1.1974 \times 10^{-6}$   $A_8 = 4.2009 \times 10^{-8}$
$A_{10} = 0$ -continued Fifth surface k = −1.8853
$A_2 = 0$     $A_4 = -2.8576 \times 10^{-4}$     $A_6 = 2.3333 \times 10^{-6}$     $A_8 = 0$
$A_{10} = 0$ Sixth surface k = −79.0789
$A_2 = 0$     $A_4 = -3.3949 \times 10^{-4}$     $A_6 = 5.6336 \times 10^{-6}$     $A_8 = 0$
$A_{10} = 0$ Ninth surface k = −0.1243
$A_2 = 0$     $A_4 = -2.0875 \times 10^{-3}$     $A_6 = 8.0147 \times 10^{-5}$     $A_8 = -1.7393 \times 10^{-5}$
$A_{10} = 0$ Tenth surface k = 0
$A_2 = 0$     $A_4 = -4.0527 \times 10^{-4}$     $A_6 = 6.6267 \times 10^{-6}$     $A_8 = 0^6$
$A_{10} = 0$ Twelfth surface k = 0
$A_2 = 0$     $A_4 = -3.0240 \times 10^{-4}$     $A_6 = 0$     $A_8 = 0$
$A_{10} = 0$ Refractive Indices Classified by Wavelengths in Medium Constituting Negative Lens $L_{AN}$ nd = 1.496999     nC = 1.495136     nF = 1.501231     ng = 1.504506
nh = 1.507205

Refractive Indices Classified by Wavelengths in Medium Constituting Positive Lens $L_{AP}$ nd = 1.634940     nC = 1.627290     nF = 1.654640     ng = 1.672908
nh = 1.689873

Zoom Data (when D0 (Distance from Object to First Surface) is Infinite)

|  | Wide-angle | Middle | Telephoto |
|---|---|---|---|
| F | 6.42002 | 11.01033 | 18.48966 |
| fno | 1.8657 | 2.4657 | 3.3907 |
| D0 | ∞ | ∞ | ∞ |
| D3 | 15.06615 | 7.17979 | 2.39997 |
| D9 | 2.26600 | 6.47996 | 11.11473 |
| D11 | 2.35470 | 2.37949 | 3.15731 |
| D13 | 3.40002 | 2.48924 | 1.66172 |
| D17 | 0.49999 | 0.49993 | 0.49990 |

Subsequently, corresponding parameter values in individual embodiments of the pre-sent invention described above are shown in Table 1.

TABLE 1

|  | Embodiment 1 | Embodiment 2 | Embodiment 3 | Embodiment 4 | Embodiment 5 |
|---|---|---|---|---|---|
| fw | 6.42001 | 6.42000 | 6.41996 | 6.41994 | 6.42002 |
| y10 | 3.6 | 3.6 | 3.6 | 3.6 | 3.6 |
| $M_{C-D}/M_B$ | 0.1685 | 0 | 0.0822 | 0.0652 | 0.1014 |
| $M_{D-1}/M_B$ | 0.1924 | 0.1996 | 0.2158 | 0.1764 | 0.2197 |
| $d_{CD}/fw$ | 0.3668 | 0.3718 | 0.4811 | 0.3930 | 0.3668 |
| $(R_{CF} + R_{CR})/(R_{CF} - R_{CR})$ | 0.2041 | −0.9128 | −0.2828 | 0.8730 | −0.3361 |
| $(R_{DF} + R_{DR})/(R_{DF} - R_{DR})$ | 0.7383 | 0.7774 | 0.7971 | 0.7549 | 0.8036 |
| ndp | 1.63494 | 1.63494 | 1.63494 | 1.63494 | 1.63494 |
| vdp | 23.22 | 23.22 | 23.22 | 23.22 | 23.22 |
| θgFp | 0.6679 | 0.6679 | 0.6679 | 0.6679 | 0.6679 |
| θhgp | 0.6203 | 0.6203 | 0.6203 | 0.6203 | 0.6203 |
| $z_{AF}(4.494)$ | −0.70327 | −0.69609 | −0.66853 | −0.71087 | −0.67517 |
| $z_{AC}(4.494)$ | 0.78934 | 0.77267 | 0.72760 | 0.67029 | 0.74051 |
| $z_{AR}(4.494)$ | 0.51930 | 0.44459 | 0.48650 | 0.46083 | 0.46447 |
| $|z_{AR}(h) - z_{AC}(h)|/tp$ *value at h = 4.494 | 0.6373 | 0.6174 | 0.6264 | 0.6254 | 0.6569 |
| tp/tn | 0.5296 | 0.6643 | 0.4811 | 0.4816 | 0.5253 |
| $k_{AF}$ | −2.8817 | −6.7681 | −2.5695 | 1.6574 | −6.5076 |
| $k_{AR}$ | −2.9323 | −7.1823 | −11.8389 | −10.1025 | −10.1897 |
| $z_{AF}(h)/z_{AR}(h)$ *value at h = 4.494 | −1.3543 | −1.5657 | −1.3742 | −1.5426 | −1.4536 |
| $_{AVE}nd_{2P}$ | 1.83481 | 1.794885 | 1.858905 | 1.858905 | 1.937405 |

TABLE 1-continued

|  | Embodiment 1 | Embodiment 2 | Embodiment 3 | Embodiment 4 | Embodiment 5 |
|---|---|---|---|---|---|
| $_{AVE}\nu d_{2N}$ | 22.76 | 24.87 | 23.86 | 23.86 | 21.15 |
| $y_{07}$ | 2.52 | 2.52 | 2.52 | 2.52 | 2.52 |
| $\tan \omega_{07w}$ | −0.41890 | −0.41885 | −0.42062 | −0.42215 | −0.41985 |

The zoom optical system of the present invention described above can be used in a photographing apparatus for photographing the image of the object through the electronic image sensor, such as a CCD or CMOS, notably in a digital camera and a video camera, and in a personal computer, a telephone, and a mobile terminal, particularly in a mobile phone that is handy to carry, which are examples of information processing apparatuses. What follows is a description of an example of the digital camera as its aspect.

Figure 11:
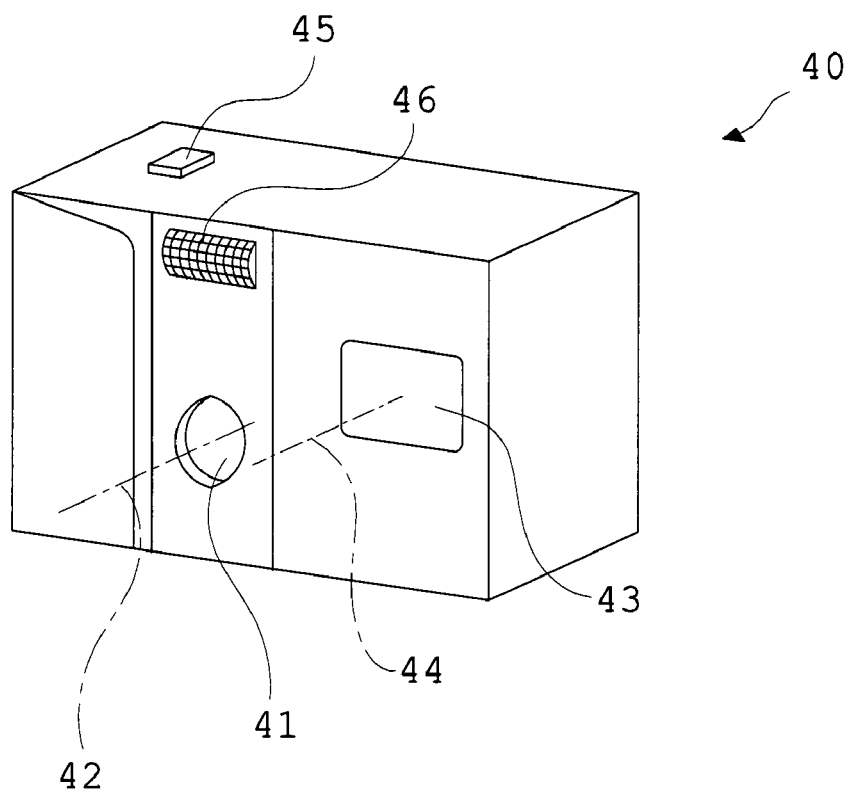
FIG. 11 is a front perspective view showing the appearance of a digital camera incorporating the zoom optical system according to the present invention.
Figure 12:
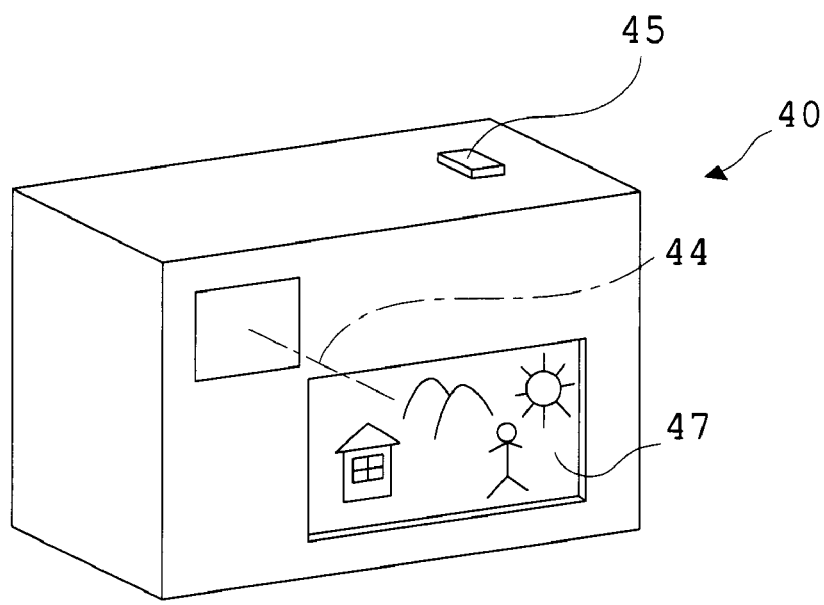
FIG. 12 is a rear perspective view showing the digital camera of FIG. 11.
Figure 13:
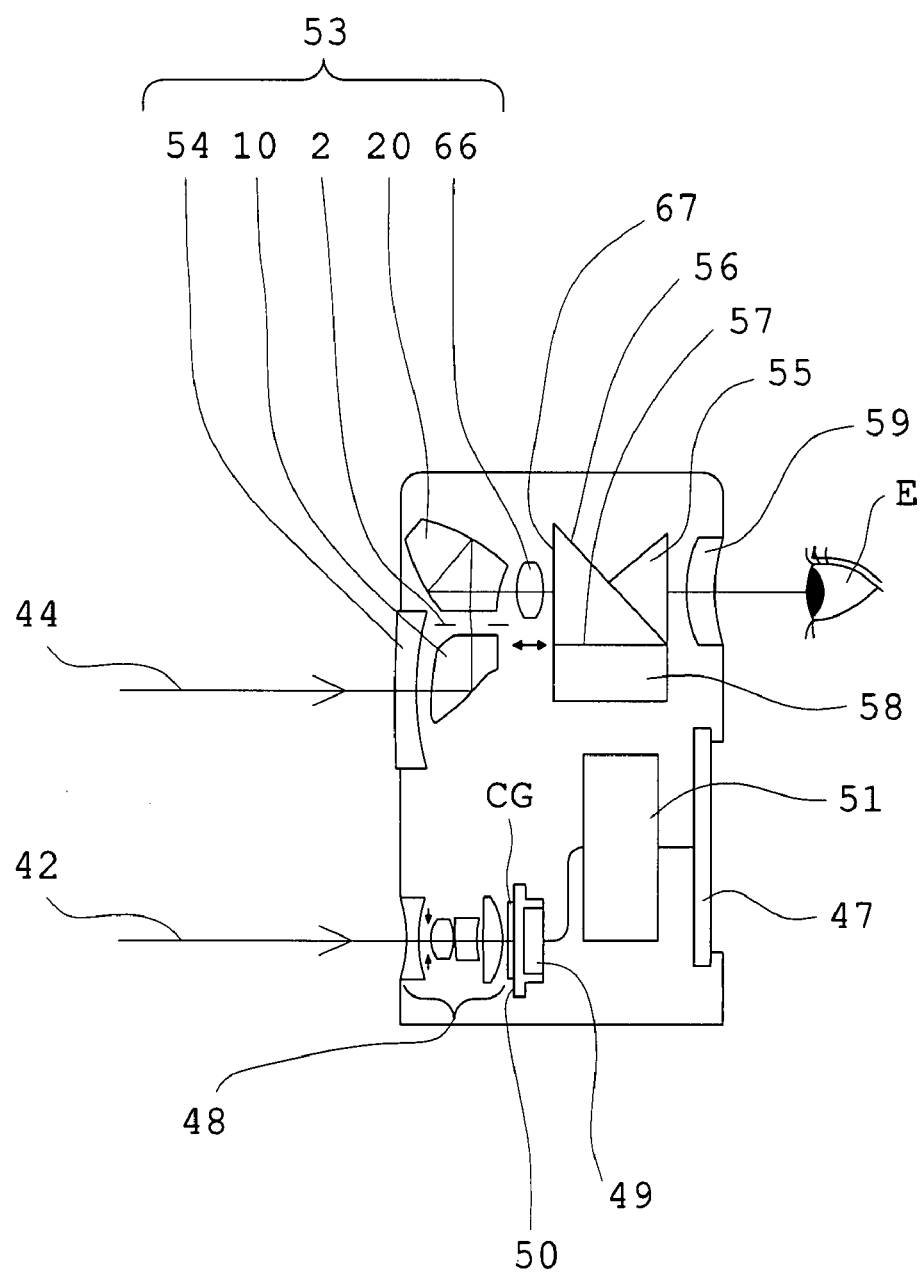
FIG. 13 is a sectional view showing the optical structure of the digital camera of FIG. 11.

FIGS. 11-13 show a digital camera incorporating the imaging optical system according to the present invention in a photographing optical system 41. FIG. 11 is a front perspective view showing the appearance of a digital camera 40. FIG. 12 is a rear perspective view showing the digital camera. FIG. 13 is a sectional view showing the optical structure of the digital camera 40.

The digital camera 40, in this example, includes the photographing optical system 41 having a photographing optical path 42, a finder optical system 43 having a finder optical path 44, a shutter button 45, a flash lamp 46, and a liquid crystal display monitor 47.

When a photographer pushes the shutter button 45 provided on the upper face of the camera 40, photographing is performed, in association with this shutter operation, through the photographing optical system 41, for example, the zoom optical system of Embodiment 1.

An image of an object produced by the photographing optical system 41 is formed on the imaging surface of a CCD 49. The image of the object received by the CCD 49 is displayed as an electronic image on the liquid crystal display monitor 47 provided on the back face of the camera, through an image processing means 51. A memory is placed in the image processing means 51 so that a photographed electronic image can also be recorded. Also, the memory may be provided to be independent of the image processing means 51 or may be constructed so that the image is electronically recorded and written by a floppy (a registered trademark) disk, memory card, or MO.

Further, a finder objective optical system 53 is located on the finder optical path 44. The finder objective optical system 53 includes a cover lens 54, a first prism 10, an aperture stop 2, a second prism 20, and a focusing lens 66. The image of the object is produced on an imaging surface 67 by the finder objective optical system 53. The image of the object is formed on a field frame 57 of a Porro prism 55 that is an image erecting member. Behind the Porro prism 55 is located an eyepiece optical system 59 that introduces an erected image into an observer's eye E.

According to the digital camera 40 constructed as mentioned above, it is possible to realize the electronic imaging apparatus having the zoom optical system in which the number of constituents of the photographing optical system 41 is reduced and the small-sized and slim design is achieved.

The present invention is favorable to the fields of the zoom optical system suitable for an electronic imaging optical system that needs to satisfy the slim design, high imaging performance, and the large aperture ratio at the same time so that an object can be clearly photographed even in surroundings in which the amount of light is small, and of the electronic imaging apparatus having this zoom optical system.

What is claimed is:

1. A zoom optical system comprising, in order from an object side:
   a lens unit A with negative refracting power, including a single lens component;
   a lens unit B with positive refracting power, simply moved toward the object side when a magnification of the zoom optical system is changed in a range from a wide-angle position to a telephoto position;
   a lens unit C with negative refracting power; and
   a lens unit D with positive refracting power,
   wherein in focusing on an object point separated at least 300 times a focal length at the wide-angle position, when the magnification is changed in the range from the wide-angle position to the telephoto position, the lens unit C and the lens unit D are moved together so that a relative spacing between the lens unit C and the lens unit D is widened or the lens unit D approaches the image side.

2. A zoom optical system according to claim 1, satisfying one of the following conditions:

$$0 \leq M_{C-D}/M_B \leq 0.4$$

$$0 \leq M_{D-I}/M_B \leq 0.5$$

where $M_B$ is an amount of movement (an absolute value) of the lens unit B when the magnification is changed in the range from the wide-angle position to the telephoto position in infinite object point focusing, $M_{C-D}$ is an amount of change (the absolute value) of the spacing between the lens unit C and the lens unit D when the magnification is changed in the range from the wide-angle position to the telephoto position in infinite object point focusing, and $M_{D-I}$ is an amount of change (the absolute value) of spacing between the lens unit D and an image sensor when the magnification is changed in the range from the wide-angle position to the telephoto position in infinite object point focusing.

3. A zoom optical system according to claim 1 or 2, wherein the lens unit C and the lens unit D are moved together in focusing.

4. A zoom optical system according to claim 3, wherein the relative spacing between the lens unit C and the lens unit D is changed in focusing.

5. A zoom optical system according to claim 4, wherein in a state where the lens unit A and the lens unit B are fixed, when the lens unit C and the lens unit D are moved to focus an object point at a shorter distance, the spacing between the lens unit C and the lens unit D is narrowed.

6. A zoom optical system according to claim 1 or 2, satisfying the following condition:

$$0.2 \leq d_{CD}/fw \leq 1.2$$

where $d_{CD}$ is the spacing between the lens unit C and the lens unit D on the optical axis in infinite object point focusing at the wide-angle position and fw is a focal length of an entire system of the zoom optical system at the wide-angle position.

7. A zoom optical system according to claim 1 or 2, wherein the lens unit C includes a negative lens alone and the lens unit D includes a positive lens alone.

8. A zoom optical system according to claim 7, satisfying the following conditions:

$$-1.5 \leq (R_{CF}+R_{CR})/(R_{CF}-R_{CR}) \leq 1.5$$

$$0.0 \leq (R_{DF}+R_{DR})/(R_{DF}-R_{DR}) \leq 1.5$$

where $R_{CF}$ is a radius of curvature of a most object-side surface in the lens unit C, $R_{CR}$ is a radius of curvature of a most image-side surface in the lens unit C, $R_{DF}$ is the radius of curvature of the most object-side surface in the lens unit D, and $R_{DR}$ is the radius of curvature of the most image-side surface in the lens unit D.

9. A zoom optical system according to claim 1 or 2, wherein a lens component of the lens unit A is a cemented lens component including, in order from object side, a negative lens and a positive lens.

10. A zoom optical system according to claim 1 or 2, wherein the lens unit B includes two lens components, a single lens component and a cemented lens component, or three lenses.

11. An electronic imaging apparatus comprising:
a zoom optical system; and
an image processing unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed,
wherein the zoom optical system is a zoom optical system according to claim 1 or 2, and in nearly infinite object point focusing, satisfies the following condition:

$$0.7 < y_{07}/(fw \cdot \tan \omega_{07w}) < 0.94$$

where $y_{07}$ is expressed by $y_{07}=0.7y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point, connecting the center of the imaging surface at a wide-angle position and a position of the image height $y_{07}$, with an optical axis, and fw is a focal length of an entire system of the zoom optical system at the wide-angle position.

* * * * *